United States Patent
Haas

(10) Patent No.: US 12,500,006 B2
(45) Date of Patent: Dec. 16, 2025

(54) DEPLOYMENT METHOD AND SYSTEMS FOR MOLTEN SALT REACTORS

(71) Applicant: Natura Resources LLC, Abilene, TX (US)

(72) Inventor: Derek Haas, Austin, TX (US)

(73) Assignee: Natura Resources LLC, Abilene, TX (US)

( * ) Notice: Subject to any disclaimer, the term of this patent is extended or adjusted under 35 U.S.C. 154(b) by 0 days.

(21) Appl. No.: 18/529,510

(22) Filed: Dec. 5, 2023

(65) Prior Publication Data

US 2025/0182918 A1    Jun. 5, 2025

(51) Int. Cl.
| | |
|---|---|
| *G21C 19/28* | (2006.01) |
| *G21D 5/02* | (2006.01) |
| *G21C 1/32* | (2006.01) |
| *G21F 5/14* | (2006.01) |

(52) U.S. Cl.
CPC .............. *G21C 19/28* (2013.01); *G21D 5/02* (2013.01); *G21C 1/322* (2013.01); *G21F 5/14* (2013.01)

(58) Field of Classification Search
CPC ............................. G21C 19/28; G21C 19/307
See application file for complete search history.

(56) References Cited

U.S. PATENT DOCUMENTS

| | | | |
|---|---|---|---|
| 2,669,465 A | 2/1954 | Newell | |
| 3,471,181 A | 10/1969 | Fuentes | |
| 3,972,547 A | 8/1976 | Itoya | |
| 4,539,846 A | 9/1985 | Grossman | |
| 5,016,920 A | 5/1991 | Anderson | |
| 5,630,592 A | 5/1997 | Obara et al. | |
| 6,125,912 A | 10/2000 | Branagan et al. | |
| 6,186,159 B1 | 2/2001 | DeGood et al. | |
| 7,160,367 B2 | 1/2007 | Babicki et al. | |
| 7,400,697 B1 | 7/2008 | Carmack et al. | |
| 7,648,792 B2 | 1/2010 | Kaschmitter | |
| 7,707,987 B2 | 5/2010 | Guthrie | |

(Continued)

FOREIGN PATENT DOCUMENTS

| | | |
|---|---|---|
| CA | 2967469 | 10/2023 |
| CA | 3003498 | 1/2024 |

(Continued)

OTHER PUBLICATIONS

Wrigley, P. A., et al. "Off-site modular construction and design in nuclear power: A systematic literature review." Progress in nuclear energy 134 (2021): 103664. (Year: 2021).*

(Continued)

*Primary Examiner* — Sharon M Davis
(74) *Attorney, Agent, or Firm* — King & Spalding LLP

(57) ABSTRACT

A deployment system for a molten salt reactor includes a reactor module, a cooling module, a coolant preparation module, a fuel shipping module, and a fuel preparation module. Each of the reactor module, the cooling module, the coolant preparation module, the fuel shipping module, and the fuel preparation module may be supplied to a deployment site. Using the coolant preparation module, a coolant salt held within the reactor module may be transferred to the cooling module. Using the fuel preparation module, a fuel salt held within the fuel shipping module may be transferred to the reactor module.

10 Claims, 17 Drawing Sheets

(56) References Cited

U.S. PATENT DOCUMENTS

| | | |
|---|---|---|
| 7,931,080 B2 | 4/2011 | O'Brien |
| 7,980,304 B2 | 7/2011 | O'Brien |
| 8,186,430 B2 | 5/2012 | O'Brien |
| 8,238,509 B2 | 8/2012 | Moen et al. |
| 8,636,892 B2 | 1/2014 | Koehl et al. |
| 8,703,063 B2 | 4/2014 | Hottovy |
| 8,746,440 B2 | 6/2014 | Williamson et al. |
| 8,767,905 B2 | 7/2014 | Neeley et al. |
| 8,771,482 B2 | 7/2014 | Bailey et al. |
| 8,900,439 B2 | 12/2014 | Wiedmeyer et al. |
| 8,956,524 B2 | 2/2015 | Wiedmeyer et al. |
| 9,008,257 B2 | 4/2015 | Hyde et al. |
| 9,017,527 B2 | 4/2015 | Wiedmeyer et al. |
| 9,074,922 B2 | 7/2015 | Dayal et al. |
| 9,150,975 B2 | 10/2015 | Berger et al. |
| 9,208,909 B2 | 12/2015 | Runkle et al. |
| 9,224,507 B2 | 12/2015 | Heinold et al. |
| 9,251,920 B2 | 2/2016 | Loewen et al. |
| 9,305,673 B2 | 4/2016 | Heinold et al. |
| 9,324,465 B2 | 4/2016 | Splichal, Jr. |
| 9,368,238 B2 | 6/2016 | Theofanous et al. |
| 9,368,241 B2 | 6/2016 | Loewen et al. |
| 9,376,639 B2 | 6/2016 | Walter et al. |
| 9,443,623 B2 | 9/2016 | Ahlfeld |
| 9,460,818 B2 | 10/2016 | Bergman |
| 9,475,706 B2 | 10/2016 | Policke et al. |
| 9,522,462 B2 | 12/2016 | Baker et al. |
| 9,691,507 B2 | 6/2017 | Hyde et al. |
| 9,691,508 B2 | 6/2017 | Hyde et al. |
| 9,728,288 B2 | 8/2017 | Hyde et al. |
| 9,748,007 B2 | 8/2017 | Hyde et al. |
| 9,761,336 B2 | 9/2017 | Caine et al. |
| 9,761,337 B2 | 9/2017 | Hyde et al. |
| 9,799,417 B2 | 10/2017 | Hyde et al. |
| 9,875,817 B2 | 1/2018 | Edwards et al. |
| 9,875,818 B2 | 1/2018 | Nygaard et al. |
| 9,881,700 B2 | 1/2018 | LeBlanc |
| 9,892,807 B2 | 2/2018 | Hyde et al. |
| 9,894,802 B2 | 2/2018 | Loewen et al. |
| 9,911,514 B2 | 3/2018 | Edwards et al. |
| 9,921,158 B2 | 3/2018 | Rider |
| 9,941,025 B2 | 4/2018 | Ahlfeld et al. |
| 10,041,163 B1 | 8/2018 | Offer et al. |
| 10,043,594 B2 | 8/2018 | Scott |
| 10,056,160 B2 | 8/2018 | LeBlanc |
| 10,141,079 B2 | 11/2018 | Czerwinski et al. |
| 10,144,874 B2 | 12/2018 | Walter et al. |
| 10,147,506 B2 | 12/2018 | Malloy, III et al. |
| 10,176,901 B2 | 1/2019 | Loewen |
| 10,197,200 B2 | 2/2019 | Kolb et al. |
| 10,221,499 B2 | 3/2019 | Miller et al. |
| 10,229,757 B2 | 3/2019 | Filippone |
| 10,280,527 B2 | 5/2019 | Loewen et al. |
| 10,290,381 B2 | 5/2019 | Caine et al. |
| 10,311,981 B2 | 6/2019 | Hackett et al. |
| 10,343,102 B2 | 7/2019 | Reasoner |
| 10,354,767 B2 | 7/2019 | Goreaud et al. |
| 10,438,705 B2 | 10/2019 | Cheatham, III |
| 10,497,479 B2 | 12/2019 | Abbott |
| 10,497,480 B2 | 12/2019 | Cheatham, III et al. |
| 10,510,450 B2 | 12/2019 | Arafat |
| 10,510,452 B2 | 12/2019 | Singh et al. |
| 10,515,729 B2 | 12/2019 | Horn et al. |
| 10,535,437 B2 | 1/2020 | Hyde et al. |
| 10,566,096 B2 | 2/2020 | Czerwinski |
| 10,573,416 B2 | 2/2020 | Venneri |
| 10,636,532 B2 | 4/2020 | Anderson et al. |
| 10,643,754 B2 | 5/2020 | Venneri |
| 10,650,934 B2 | 5/2020 | Caine et al. |
| 10,665,356 B2 | 5/2020 | Abbott |
| 10,685,750 B2 | 6/2020 | Eichel et al. |
| 10,734,122 B2 | 8/2020 | Cisneros, Jr. |
| 10,738,367 B2 | 8/2020 | Hackett |
| 10,741,293 B2 | 8/2020 | Abbott |
| 10,746,330 B2 | 8/2020 | Hughes |
| 10,746,331 B2 | 8/2020 | Katoliussen |
| 10,755,822 B2 | 8/2020 | Gibbons et al. |
| 10,760,004 B2 | 9/2020 | Garcia-Perez et al. |
| 10,787,609 B2 | 9/2020 | Garcia-Perez et al. |
| 10,787,610 B2 | 9/2020 | Goodrich et al. |
| 10,825,571 B2 | 11/2020 | Edwards et al. |
| 10,867,710 B2 | 12/2020 | Cisneros, Jr. |
| 10,923,238 B2 | 2/2021 | Abbott |
| 10,937,557 B2 | 3/2021 | Sineath et al. |
| 10,962,461 B2 | 3/2021 | Linneen |
| 11,028,303 B2 | 6/2021 | Corbin et al. |
| 11,031,140 B2 | 6/2021 | Hunt et al. |
| 11,043,309 B2 | 6/2021 | Nygaard et al. |
| 11,049,624 B2 | 6/2021 | Loewen et al. |
| 11,075,013 B2 | 7/2021 | Abbott et al. |
| 11,075,015 B2 | 7/2021 | Cisneros, Jr. |
| 11,133,114 B2 | 9/2021 | Hackett et al. |
| 11,136,245 B2 | 10/2021 | Benson |
| 11,145,424 B2 | 10/2021 | Abbott |
| 11,149,623 B2 | 10/2021 | Kutsch |
| 11,157,665 B2 | 10/2021 | Cheatham, III et al. |
| 11,158,431 B2 | 10/2021 | Schonfeldt et al. |
| 11,170,901 B2 | 11/2021 | Cheatham, III |
| 11,200,991 B2 | 12/2021 | LeBlanc |
| 11,205,523 B2 | 12/2021 | Hyde et al. |
| 11,257,600 B2 | 2/2022 | Anderson et al. |
| 11,264,141 B2 | 3/2022 | Venneri |
| 11,276,503 B2 | 3/2022 | Cisneros, Jr. et al. |
| 11,289,212 B2 | 3/2022 | Inman et al. |
| 11,342,084 B2 | 5/2022 | Cheatham, III et al. |
| 11,342,085 B2 | 5/2022 | Hinds |
| 11,373,765 B2 | 6/2022 | Czerwinski |
| 11,380,450 B2 | 7/2022 | Sineath et al. |
| 11,417,435 B2 | 8/2022 | Nelson |
| 11,417,437 B2 | 8/2022 | Venneri |
| 11,424,041 B2 | 8/2022 | Fisher et al. |
| 11,428,564 B2 | 8/2022 | Dayal et al. |
| 11,434,429 B2 | 9/2022 | Goodrich et al. |
| 11,437,156 B2 | 9/2022 | Russell, II et al. |
| 11,443,859 B2 | 9/2022 | Bass |
| 11,482,345 B2 | 10/2022 | Hunt et al. |
| 11,488,731 B2 | 11/2022 | Abbott |
| 11,495,363 B2 | 11/2022 | Gramlich et al. |
| 11,501,883 B2 | 11/2022 | Eichel et al. |
| 11,508,488 B2 | 11/2022 | Ougouag et al. |
| 11,521,757 B2 | 12/2022 | O'Brien |
| 11,542,437 B2 | 1/2023 | Garcia-Perez et al. |
| 11,545,274 B2 | 1/2023 | Bass et al. |
| 11,569,000 B2 | 1/2023 | Hinds |
| 11,574,094 B2 | 2/2023 | Pivovar et al. |
| 11,636,956 B2 | 4/2023 | Gauthe et al. |
| 11,728,052 B2 | 8/2023 | Cisneros et al. |
| 11,746,550 B2 * | 9/2023 | Bass ................ G21C 13/00 52/741.12 |
| 11,756,698 B2 * | 9/2023 | Reyes, Jr. ............. G21C 15/26 376/293 |
| 11,842,819 B2 * | 12/2023 | Corbin ................ G21C 17/022 |
| 11,875,906 B2 | 1/2024 | LeBlanc |
| 11,894,155 B2 | 2/2024 | Freeman et al. |
| 11,984,231 B2 | 5/2024 | Keller et al. |
| 11,990,249 B2 | 5/2024 | Cheatham et al. |
| 11,990,815 B2 | 5/2024 | Stubsgaard et al. |
| 11,996,208 B2 | 5/2024 | Callaway et al. |
| 12,012,827 B1 | 6/2024 | Haas |
| 12,018,779 B2 | 6/2024 | Bailey |
| 12,100,523 B2 | 9/2024 | Callaway et al. |
| 12,140,000 B1 | 11/2024 | Haas |
| 12,154,697 B2 | 11/2024 | Cisneros et al. |
| 12,187,619 B2 | 1/2025 | Robison |
| 12,211,627 B2 | 1/2025 | Reyes et al. |
| 12,249,434 B2 | 3/2025 | Arrasmith |
| 12,292,138 B2 | 5/2025 | Bailey |
| 12,374,467 B2 | 7/2025 | Laumen |
| 2007/0267867 A1 | 11/2007 | Kloss |
| 2009/0046825 A1 | 2/2009 | Dulka et al. |
| 2009/0173491 A1 | 7/2009 | O'Brien |
| 2010/0127493 A1 | 5/2010 | Felder |
| 2012/0012330 A1 | 1/2012 | Botich |
| 2012/0082911 A1 | 4/2012 | Hyde et al. |

(56) References Cited

U.S. PATENT DOCUMENTS

| | | |
|---|---|---|
| 2012/0082913 A1 | 4/2012 | Hyde et al. |
| 2012/0087455 A1 | 4/2012 | Hyde et al. |
| 2012/0183112 A1 | 7/2012 | LeBlanc |
| 2013/0083878 A1 | 4/2013 | Massie et al. |
| 2014/0185733 A1 | 7/2014 | Povirk et al. |
| 2014/0312617 A1 | 10/2014 | Okabe |
| 2015/0117589 A1 | 4/2015 | Kamei |
| 2015/0228363 A1 | 8/2015 | Dewan et al. |
| 2015/0243376 A1* | 8/2015 | Wilson .................... G21D 5/08 376/347 |
| 2015/0310948 A1 | 10/2015 | Venneri |
| 2016/0189812 A1 | 6/2016 | Czerwinski |
| 2016/0189813 A1 | 6/2016 | Cisneros, Jr. |
| 2016/0217874 A1 | 7/2016 | Dewan et al. |
| 2016/0272903 A1 | 9/2016 | Walter et al. |
| 2016/0305587 A1 | 10/2016 | Vigre |
| 2017/0206984 A1 | 7/2017 | Lee et al. |
| 2017/0271033 A1 | 9/2017 | Dodson et al. |
| 2017/0292179 A1 | 10/2017 | Hackett |
| 2017/0294240 A1* | 10/2017 | Baglietto .................. G21D 1/00 |
| 2017/0294241 A1 | 10/2017 | Dodson et al. |
| 2017/0301413 A1 | 10/2017 | Cisneros, Jr. |
| 2017/0301416 A1 | 10/2017 | Hansen |
| 2017/0301418 A1* | 10/2017 | Dodson .................... G21C 3/54 |
| 2017/0316840 A1 | 11/2017 | Abbott |
| 2018/0030576 A1 | 2/2018 | Urza |
| 2018/0080587 A1 | 3/2018 | Gauss |
| 2018/0238477 A1 | 8/2018 | Gauss |
| 2018/0244535 A1 | 8/2018 | Russell, II et al. |
| 2018/0254109 A1 | 9/2018 | Cheatham, III et al. |
| 2018/0322968 A1 | 11/2018 | Cheatham, III et al. |
| 2019/0035510 A1 | 1/2019 | LeBlanc |
| 2019/0057783 A1 | 2/2019 | LeBlanc |
| 2019/0066857 A1 | 2/2019 | Hackett et al. |
| 2019/0139665 A1 | 5/2019 | Czerwinski et al. |
| 2019/0203614 A1 | 7/2019 | Loewen et al. |
| 2019/0371482 A1 | 12/2019 | Benson |
| 2020/0027581 A1 | 1/2020 | Hackett et al. |
| 2020/0049281 A1 | 2/2020 | Zuzelski |
| 2020/0087156 A1 | 3/2020 | Kelleher |
| 2020/0118698 A1 | 4/2020 | Czerwinski et al. |
| 2020/0122109 A1 | 4/2020 | Kruizenga et al. |
| 2020/0161015 A1 | 5/2020 | Czerwinski et al. |
| 2020/0373024 A1 | 11/2020 | Gramlich |
| 2020/0393123 A1 | 12/2020 | Aly |
| 2021/0047199 A1 | 2/2021 | Russell, II et al. |
| 2021/0047568 A1 | 2/2021 | Goodrich et al. |
| 2021/0095645 A1 | 4/2021 | Cheatham, III |
| 2021/0098143 A1 | 4/2021 | Trojer et al. |
| 2021/0130181 A1 | 5/2021 | Brown et al. |
| 2021/0170676 A1 | 6/2021 | Kitchen et al. |
| 2021/0210224 A1 | 7/2021 | Cisneros, Jr. |
| 2021/0230024 A1 | 7/2021 | Yin |
| 2021/0272707 A1 | 9/2021 | Wardle |
| 2021/0272708 A1 | 9/2021 | Cisneros, Jr. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0313081 A1 | 10/2021 | Nygaard et al. |
| 2021/0318673 A1 | 10/2021 | Kitchen et al. |
| 2021/0319920 A1 | 10/2021 | Gramlich et al. |
| 2021/0343431 A1 | 11/2021 | Cisneros, Jr. |
| 2022/0005619 A1 | 1/2022 | Cisneros, Jr. |
| 2022/0017382 A1 | 1/2022 | Russell, II et al. |
| 2022/0051814 A1 | 2/2022 | Freeman et al. |
| 2022/0051816 A1 | 2/2022 | Freeman |
| 2022/0051817 A1 | 2/2022 | Hejzlar et al. |
| 2022/0051818 A1 | 2/2022 | Cisneros, Jr. |
| 2022/0051820 A1 | 2/2022 | Corbin |
| 2022/0068512 A1 | 3/2022 | Russell, II et al. |
| 2022/0081317 A1 | 3/2022 | Russell, II et al. |
| 2022/0115149 A1 | 4/2022 | Barringer et al. |
| 2022/0115150 A1 | 4/2022 | Hackett et al. |
| 2022/0115152 A1 | 4/2022 | Barringer et al. |
| 2022/0139576 A1 | 5/2022 | Inman et al. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0254524 A1 | 8/2022 | Cheatham, III et al. |
| 2022/0301729 A1 | 9/2022 | Cisneros, Jr. |
| 2022/0301732 A1 | 9/2022 | Venneri et al. |
| 2022/0310278 A1 | 9/2022 | Choi et al. |
| 2022/0310281 A1 | 9/2022 | Czerwinski |
| 2022/0324066 A1 | 10/2022 | Argentine |
| 2022/0328202 A1 | 10/2022 | Venneri et al. |
| 2022/0328203 A1 | 10/2022 | Bass et al. |
| 2022/0328205 A1 | 10/2022 | Bass et al. |
| 2022/0336118 A1 | 10/2022 | Corbin et al. |
| 2022/0351870 A1 | 11/2022 | Fisher et al. |
| 2022/0363995 A1 | 11/2022 | Goodrich et al. |
| 2022/0375635 A9 | 11/2022 | LeBlanc |
| 2022/0405446 A1 | 12/2022 | Hu |
| 2023/0024126 A1 | 1/2023 | Harada |
| 2023/0024338 A1 | 1/2023 | Reed et al. |
| 2023/0045226 A1 | 2/2023 | Jaques et al. |
| 2023/0088516 A1 | 3/2023 | Bailey |
| 2023/0096162 A1 | 3/2023 | Loewen et al. |
| 2023/0104365 A1 | 4/2023 | Eichel et al. |
| 2023/0142755 A1 | 5/2023 | Le Corre et al. |
| 2023/0273058 A1 | 8/2023 | Head |
| 2023/0279756 A1 | 9/2023 | Tasang |
| 2023/0290528 A1* | 9/2023 | Venneri .................... G21D 1/02 |
| 2023/0317306 A1 | 10/2023 | Botha et al. |
| 2023/0323695 A1 | 10/2023 | Johnson |
| 2023/0326619 A1 | 10/2023 | Snead |
| 2023/0377763 A1 | 11/2023 | Botha et al. |
| 2023/0392274 A1 | 12/2023 | Harb et al. |
| 2023/0395270 A1 | 12/2023 | Benson et al. |
| 2024/0013936 A1 | 1/2024 | Kim et al. |
| 2024/0013937 A1 | 1/2024 | Kimber |
| 2024/0017212 A1 | 1/2024 | Miller et al. |
| 2024/0035119 A1 | 2/2024 | Tilton et al. |
| 2024/0112822 A1 | 4/2024 | Lucas et al. |
| 2024/0120118 A1 | 4/2024 | Aleshin et al. |
| 2024/0124985 A1 | 4/2024 | Tsang et al. |
| 2024/0190748 A1 | 6/2024 | Kim |
| 2024/0246023 A1 | 7/2024 | Tsang et al. |
| 2024/0249852 A1 | 7/2024 | Head |
| 2024/0257988 A1 | 8/2024 | Stubsgaard et al. |
| 2024/0266080 A1 | 8/2024 | Liszkai et al. |
| 2024/0266084 A1 | 8/2024 | Moore |
| 2024/0275257 A1 | 8/2024 | Stubsgaard et al. |
| 2024/0308850 A1 | 9/2024 | Tsang et al. |
| 2025/0022624 A1 | 1/2025 | Makarewicz |
| 2025/0054648 A1 | 2/2025 | Haas |
| 2025/0062042 A1 | 2/2025 | Haas |
| 2025/0084734 A1 | 3/2025 | Haas |
| 2025/0130121 A1 | 4/2025 | Gates |
| 2025/0132064 A1 | 4/2025 | Kugelmass et al. |
| 2025/0144578 A1 | 5/2025 | Pamplin |
| 2025/0149196 A1 | 5/2025 | Scherr |
| 2025/0174369 A1 | 5/2025 | Clarno |
| 2025/0182916 A1 | 6/2025 | Haas |
| 2025/0182918 A1 | 6/2025 | Haas |
| 2025/0191795 A1 | 6/2025 | Watson |
| 2025/0206604 A1 | 6/2025 | Tsang |
| 2025/0206605 A1 | 6/2025 | Tsang |
| 2025/0214835 A1 | 7/2025 | Tsang |
| 2025/0246334 A1 | 7/2025 | Botha |

FOREIGN PATENT DOCUMENTS

| | | |
|---|---|---|
| CA | 3018050 | 5/2024 |
| CN | 102878109 | 11/2014 |
| CN | 104214420 | 12/2014 |
| CN | 102937090 | 4/2015 |
| CN | 104862531 | 8/2015 |
| CN | 105060914 | 11/2015 |
| CN | 106247043 | 12/2016 |
| CN | 106425315 | 2/2017 |
| CN | 105334138 | 1/2018 |
| CN | 106180254 | 6/2018 |
| CN | 108151567 | 6/2018 |
| CN | 108172318 | 6/2018 |

(56) References Cited

FOREIGN PATENT DOCUMENTS

| | | |
|---|---|---|
| CN | 108389634 | 8/2018 |
| CN | 108511088 | 9/2018 |
| CN | 108520785 | 9/2018 |
| CN | 207850147 | 9/2018 |
| CN | 108624839 | 10/2018 |
| CN | 107034386 | 11/2018 |
| CN | 107130242 | 3/2019 |
| CN | 107238627 | 3/2019 |
| CN | 109509562 | 3/2019 |
| CN | 106840765 | 4/2019 |
| CN | 109671510 | 4/2019 |
| CN | 105976879 | 5/2019 |
| CN | 108198635 | 7/2019 |
| CN | 110042434 | 7/2019 |
| CN | 108206065 | 9/2019 |
| CN | 109022921 | 9/2019 |
| CN | 107469628 | 10/2019 |
| CN | 107945887 | 10/2019 |
| CN | 108389632 | 10/2019 |
| CN | 109234573 | 10/2019 |
| CN | 209496626 | 10/2019 |
| CN | 110783010 | 2/2020 |
| CN | 110842494 | 2/2020 |
| CN | 210039648 | 2/2020 |
| CN | 108167195 | 7/2020 |
| CN | 111508627 | 8/2020 |
| CN | 211742680 | 10/2020 |
| CN | 112111251 | 12/2020 |
| CN | 112284170 | 1/2021 |
| CN | 112322939 | 2/2021 |
| CN | 110549697 | 4/2021 |
| CN | 112609195 | 4/2021 |
| CN | 212934166 | 4/2021 |
| CN | 110444311 | 5/2021 |
| CN | 112778012 | 5/2021 |
| CN | 108417277 | 6/2021 |
| CN | 110695091 | 6/2021 |
| CN | 113202780 | 8/2021 |
| CN | 113369652 | 9/2021 |
| CN | 214529256 | 10/2021 |
| CN | 113630582 | 11/2021 |
| CN | 113658722 | 11/2021 |
| CN | 111334258 | 12/2021 |
| CN | 111421913 | 12/2021 |
| CN | 113744900 | 12/2021 |
| CN | 113851233 | 12/2021 |
| CN | 214998262 | 12/2021 |
| CN | 113936820 | 1/2022 |
| CN | 113990535 | 1/2022 |
| CN | 111627571 | 2/2022 |
| CN | 113061781 | 2/2022 |
| CN | 114074234 | 2/2022 |
| CN | 114093529 | 2/2022 |
| CN | 215770541 | 2/2022 |
| CN | 111057993 | 3/2022 |
| CN | 114774738 | 7/2022 |
| CN | 112228853 | 8/2022 |
| CN | 112259263 | 8/2022 |
| CN | 112530614 | 8/2022 |
| CN | 114917603 | 8/2022 |
| CN | 114927242 | 8/2022 |
| CN | 111627572 | 9/2022 |
| CN | 111945171 | 9/2022 |
| CN | 112174670 | 9/2022 |
| CN | 115050490 | 9/2022 |
| CN | 115076479 | 9/2022 |
| CN | 111739665 | 10/2022 |
| CN | 112992389 | 11/2022 |
| CN | 115351276 | 11/2022 |
| CN | 112587989 | 12/2022 |
| CN | 113241200 | 12/2022 |
| CN | 115436402 | 12/2022 |
| EP | 3066375 | 1/2018 |
| EP | 3563389 | 7/2021 |
| EP | 3646344 | 12/2023 |
| EP | 4022649 | 12/2023 |
| EP | 4297043 | 12/2023 |
| EP | 4052274 | 2/2024 |
| EP | 4348684 | 4/2024 |
| EP | 4352750 | 4/2024 |
| EP | 4354460 | 4/2024 |
| EP | 4377974 | 5/2024 |
| EP | 4196733 | 6/2024 |
| EP | 3619722 | 10/2024 |
| EP | 4214722 | 10/2024 |
| EP | 4445390 | 10/2024 |
| EP | 4471258 | 12/2024 |
| EP | 3953947 | 1/2025 |
| EP | 4022650 | 1/2025 |
| EP | 4487351 | 1/2025 |
| EP | 4534194 | 6/2025 |
| EP | 4562657 | 6/2025 |
| EP | 4314687 | 7/2025 |
| FR | 2951578 | 4/2011 |
| GB | 821221 | 10/1959 |
| GB | 1402100 | 8/1975 |
| JP | 2022179393 | 12/2022 |
| JP | 2022182545 | 12/2022 |
| KR | 10-2292221 | 8/2021 |
| KR | 102495764 | 2/2023 |
| WO | WO 2013077941 | 10/2013 |
| WO | WO 2014039641 | 6/2014 |
| WO | WO 2015017928 | 2/2015 |
| WO | WO 2015094450 | 10/2015 |
| WO | WO 2017032379 | 3/2017 |
| WO | WO 2017059360 | 4/2017 |
| WO | WO 2017192607 | 11/2017 |
| WO | WO 2018009433 | 1/2018 |
| WO | WO 2018013317 | 1/2018 |
| WO | WO 20180311 | 2/2018 |
| WO | WO 2017199059 | 2/2018 |
| WO | WO 2018026429 | 3/2018 |
| WO | WO 2018042216 | 4/2018 |
| WO | WO 2018064572 | 4/2018 |
| WO | WO2018071081 | 5/2018 |
| WO | WO 2018084940 | 6/2018 |
| WO | WO-2018213669 A2 * 11/2018 ............ G21C 1/322 |
| WO | WO 2018213669 | 1/2019 |
| WO | WO 2019152595 | 8/2019 |
| WO | WO 2019226218 | 1/2020 |
| WO | WO 2019231971 | 1/2020 |
| WO | WO 2020123513 | 8/2020 |
| WO | WO 2021151055 | 7/2021 |
| WO | WO 2021133952 | 9/2021 |
| WO | WO 2022022792 | 2/2022 |
| WO | WO 2022039795 | 2/2022 |
| WO | WO 2022039893 | 2/2022 |
| WO | WO 2022040116 | 3/2022 |
| WO | WO 2022061195 | 4/2022 |
| WO | WO 2022146446 | 7/2022 |

OTHER PUBLICATIONS

Mcfarlane et al. Fission Product Volatility and Off-Gas Systems for Molten Salt Reactors. US Department of Energy, Sep. 3, 2019.
Drilling Formulas, API Ring Gaskets Used in BOP Connections, pp. 1-5 (Year: 2014).
Types of Flanges. [online]. Wermac. Retrieved from the Internet: <URL:https://web.archive.org/web/20201111190327/https:// www.wermac.org/flanges/flanges_welding-neck_socket-weld_lap-joint_screwed_bl ind .html > (Year: 2020).
RELAP5-3D, https://inl.gov/relap53d/.
System Analysis Module (SAM), https://www.anl.gov/nse/system-analysis-module.
"Kile et al. ""Assessment of Scale and Melcor for a generic pebble bed fluoride high-temperature reactor,"" Annals of Nuclear Energy vol. 173, Aug. 2022, 109107".
"B. Chanaron, C. Ahnert, Nicolas Crouzet, Victor Sanchez, Nikola Kolev, et al.. Advanced Multi physics Simulation for Reactor Safety in the framework of the NURESAFE Project. Annals of Nuclear Energy, 2015, 84, pp. 166-177. ff10.1016/j.anucene.2014.12.013ff. ffcea-02386823f".

(56) References Cited

OTHER PUBLICATIONS

"Lee et al. ""Multi-physics simulation of nuclear reactor core by coupled simulation using Cupid/Master,"" International Journal of Heat and Mass Transfer vol. 115, Part A, Dec. 2017, pp. 1020-1032".
Wrigley, et al. "Off-site modular construction and design in nuclear power: A systematic literature review," Progree in Nucelar energy 134 (2021).
El-Genk. "A walk-away safe, Very-Small, Long-Life, Modular (VSLLIM) reactor for portable and stationary power," Annals of Nuclear Energy 129 (2019) 181-198. Jan. 13, 2019 (Jan. 13, 2019).
Erickson. "Wastewater from fracking: Growing disposal challenge or untapped resource?," Chemical and Engineering News, vol. 97, Issue 45. Nov. 17, 2019 (Nov. 17, 2019).
Frontiermedia. "What is aFracking Pond and All the Various Alternatives?," Blog/Well Water Solutions and Rentals, Inc. Oct. 10, 2016.
Bond. "Why Capturing Methane is So Difficult," Scientific American. Jan. 17, 2023 (Jan. 17, 2023). Retrieved on Mar. 18, 2025.
Lane, James A, Herbert G. MacPherson, and Frank Maslan. Fluid fuel reactors: Molten salt reactors, aqueous homogeneous reactors, fluoride reactors, chloride reactors, liquid metal reactors and why liquid fission. Addison-Wesley Pub. Co., 1958, Chapter 15. (Year: 1958).

\* cited by examiner

DEPLOYMENT METHOD AND SYSTEMS FOR MOLTEN SALT REACTORS

TECHNICAL FIELD

The described examples relate generally to systems, devices, and techniques for deploying and decommissioning a molten salt nuclear reactor system.

BACKGROUND

Molten salt nuclear reactor systems may be constructed off-site and shipped to a generation location, such as any location at which the molten salt nuclear reactor system is used to generate heat for various uses, including electricity production, chemical treatment, desalinization, and other uses. The molten salt nuclear reactor system may include numerous functional components that require assembly at the generation site. The molten salt nuclear reactor system may also require numerous fluids or functional salts, including a coolant salt and a fuel salt (e.g., a molten salt having a fissile material therein), in order to operate and generate said heat. Assembling, storing, and transferring the numerous functional components and fluids at the generation location may be burdensome or impractical with conventional approaches to reactor construction, which may not generally be configured for remote, modular deployment, and which may generally require a location-customized approach to assembly. Further, on decommissioning, conventional approaches may lack the ability to modularly deconstruct, reuse, and repurpose functional components and fluids (or functional salts) of the system for future use. As such, there is a need for systems and techniques to facilitate the remote, modular deployment of molten salt nuclear reactor systems, and decommissioning thereof.

SUMMARY

In one example, a deployment system for a molten salt reactor is disclosed. The deployment system includes a reactor module including functional components of a molten salt reactor and having a coolant salt held therein. The deployment system further includes a cooling module including functional components of a heat removal assembly. The heat removal assembly is couplable with the reactor module to transfer heat generated by the molten salt reactor to an external process. The deployment system further includes a coolant preparation module couplable with the reactor module and the cooling module and configured to transfer the coolant salt to the cooling module prior to operation of the reactor module. The deployment system further includes a fuel shipping module housing a fuel salt therein. The deployment system further includes a fuel preparation module couplable with the fuel shipping module and the reactor module and configured to transfer the fuel salt to the reactor module subsequent to the transfer of the coolant salt and prior to the operation of the reactor module.

In another example, the functional components of the molten salt reactor may include a reactor module configured to house and control fission reactions therein. The coolant salt may be stored or shipped in the reactor module.

In another example, the functional components of the heat removal assembly may include a primary coolant loop module configured to circulate the coolant salt between a secondary heat exchanger of the primary cooling module and a primary heat exchanger of the reactor module. The coolant preparation module may be configured to transfer the coolant salt from the reactor module to the primary coolant loop prior to operation of the reactor module.

In another example, the coolant preparation module may be further configured to treat the coolant salt enroute to the cooling module, including filtering the coolant salt and/or chemically altering the coolant salt.

In another example, the coolant preparation module may be further configured to heat the coolant salt enroute to the cooling module.

In another example, the fuel shipping module may include an outer container sized for transport using a semi-trailer truck. The fuel shipping module may further include an inner container fully within the outer container and housing the fuel salt. The inner container and the outer container and inner container may cooperate to permit transport of the fuel salt on public roads and highways to a deployment site.

In another example, the outer container and the inner container may be separable from one another at the deployment site. The fuel preparation module may be couplable with the inner container and configured to induce a flow of the fuel salt therefrom and into a holding tank of the fuel preparation module.

In another example, the fuel preparation module may be further configured to treat the fuel salt enroute to the reactor module, including filtering the fuel salt and/or chemically altering the fuel salt held within the holding tank.

In another example, the fuel preparation module may be further configured to heat the fuel salt enroute to the reactor module, including heating the fuel salt held within the inner container and/or the holding tank.

In another example, the reactor module, the cooling module, the coolant preparation module, the fuel shipping module, and the fuel preparation module may be each deliverable to the deployment site via one or more semi-trailer trucks.

In another example, subsequent to cessation of the operation of the reactor module, the coolant preparation module may be couplable with the cooling module and reactor module to remove the coolant salt from the cooling module and flush one or more of the functional components of the molten salt reactor with the coolant.

In another example, subsequent to cessation of the operation of the reactor module, the fuel preparation module may be couplable with the reactor module to transfer the fuel salt from the one or more of the functional components of the molten salt reactor to the fuel shipping module.

In another example, a method of deploying a molten salt reactor is disclosed. The method includes supplying a reactor module, a cooling module, a coolant preparation module, a fuel shipping module, and a fuel preparation module to a deployment site. The method further includes transferring, using the coolant preparation module, a coolant salt held within the reactor module to the cooling module. The method further includes transferring, using the fuel preparation module, a fuel salt held within the fuel shipping module to the reactor module.

In another example, the transferring of the coolant salt may further include treating, using the coolant preparation module, the coolant salt, including filtering the coolant salt and/or chemically altering the coolant salt.

In another example, the transferring of the coolant salt may further include heating, using the coolant preparation module, the coolant salt.

In another example, the transferring of the fuel salt may further include: (i) inducing, using the fuel preparation module, a flow of the fuel salt from an inner container of the fuel shipping module and into a holding tank of the fuel preparation module, and (ii) treating, using the fuel preparation module, the fuel salt, including filtering the fuel salt and/or chemically altering the fuel salt held within the holding tank.

In another example, the transferring of the fuel salt may further include: (i) inducing, using the fuel preparation module, a flow of the fuel salt from an inner container of the fuel shipping module and into a holding tank of the fuel preparation module, and (ii) heating, using the fuel preparation module, the fuel salt, including heating the fuel salt held within the inner container and/or the holding tank.

In another example, a method of decommissioning a molten salt reactor is disclosed. The method includes supplying a coolant preparation module, a fuel preparation module, and a fuel shipping module to a deployment site. The deployment site has a used cooling module including a used coolant salt and a used reactor module including a used fuel salt. The method further includes removing, using the fuel preparation module, the fuel salt from the used reactor module and transferring said fuel salt to the fuel shipping module. The method further includes removing, using the coolant preparation module, the coolant salt from the used cooling module and transferring said coolant salt to the used reactor module to flush one or more functional components of the used reactor module with said coolant salt.

In another example, the method may further include transporting, on public roads and highways, the fuel shipping module to a reactor factory or decommissioning facility.

In another example, the method may further include transporting, using a fleet of semi-trailer trucks, each of the coolant preparation module, the fuel preparation module, the fuel shipping module, the used cooling module and the used reactor module away from the deployment site.

In another example, the method may further include filling the reactor module with coolant salt prior to shipping the reactor module back to a reactor factory or decommissioning facility.

In addition to the example aspects described above, further aspects and examples will become apparent by reference to the drawings and by study of the following description.

Figure 1:
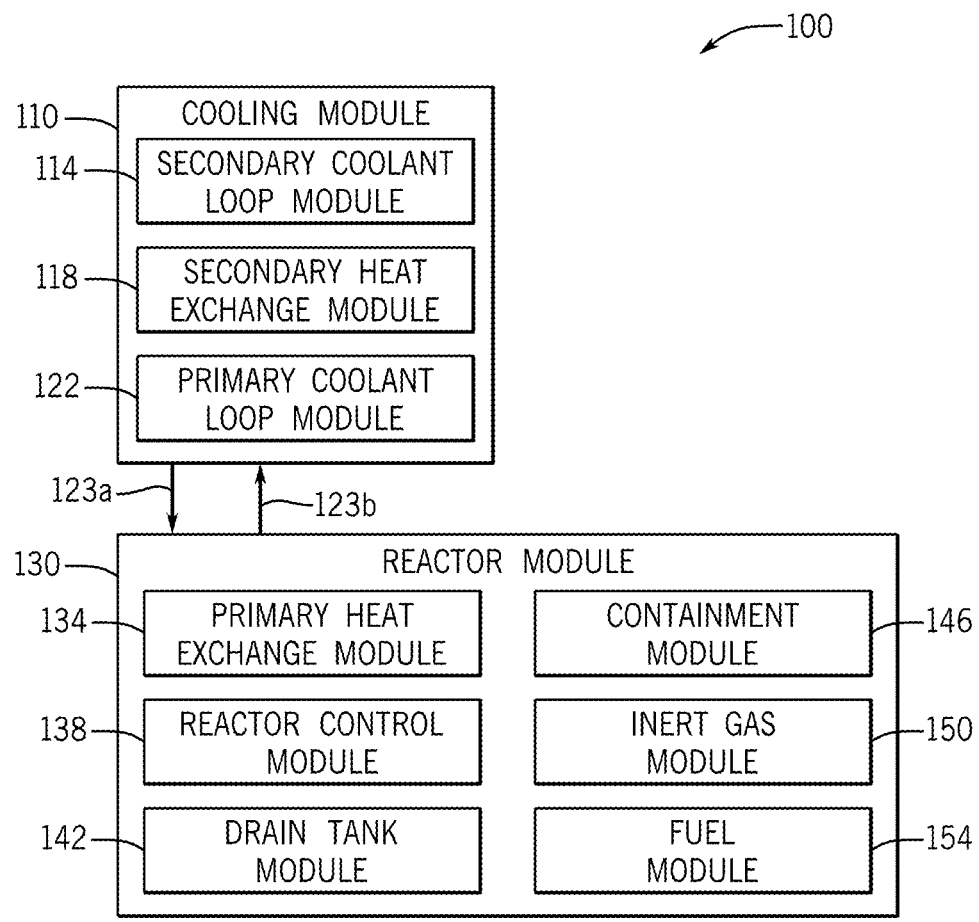
FIG. 1 depicts a functional diagram of a nuclear reactor system including a cooling module and a reactor module.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to systems, devices, and techniques for deploying and decommissioning a molten salt nuclear reactor. As used herein, a molten salt nuclear reactor or reactor system may broadly include any of a variety of molten salt reactors that are used to produce nuclear power in part by utilizing molten salts as a nuclear fuel in place of the conventional solid fuels used in light water reactors. Advantages include efficient fuel utilization and enhanced safety (in part due to replacing water as a coolant with molten salt). In molten salt reactors, fission reactions occur within a molten salt composition housed within a reactor vessel. This composition, or more generally referred to herein as a process fluid, may be circulated through a reactor vessel, a reactor pump, a heat exchanger, and/or other associated process equipment in the molten salt system. In some cases, each of these and other functional components may be integrated into a single "pool-type" or integral molten salt reactor, in which the components of the reactor functionally associated with the reactor may be disposed inside a common enclosure with the reactor core. Example molten salt reactors are described in greater detail herein, such as with reference to FIGS. 2 and 12-15, which depict an example integral molten salt reactor used with the present disclosure.

Molten salt nuclear reactors or reactor systems may be constructed off-site and shipped to a generation location, such as any location at which the molten salt nuclear reactor system is used to generate heat for various uses, including electricity production, chemical treatment, desalinization, and other uses. The molten salt nuclear reactor system may include numerous functional components that require assembly at the generation site. The molten salt nuclear reactor system may also require numerous fluids or functional salts, including a coolant salt and a fuel salt (e.g., a molten salt having a fissile material therein), in order to operate and generate said heat. Assembling, storing, and transferring the numerous functional components and fluids at the generation location may be burdensome or impractical with conventional approaches to reactor construction, which may not generally be configured for remote, modular deployment, and which may generally require a location-customized approach to assembly. Further, on decommissioning, conventional approaches may lack the ability to modularly deconstruct, reuse, and repurpose functional components and fluids (or functional salts) of the system for future use. Accordingly, conventional approaches to molten salt reactor may lack the ability for remote, modular deployment and decommissioning in an efficient and repeatable manner.

To mitigate these and other challenges, the molten salt reactor deployment systems and methods of the present disclosure include a collection of modular, functional modules that may be deployed to any given generation location at which the molten salt reactor is to be deployed for generation of heat. The modular functional modules may be standardized modules that include various components, assemblies, subassemblies and the like that are capable of transport to the generation location on public roads and highways, and which are capable of assembly and coupling with one another at the generation location to create the molten salt reactor system at the generation location. Further, the modular, functional modules may be configured to store and transport the various fluids required for operation of the molten salt reactor system, including storage and transportation of the coolant salt and fuel salt (e.g., a molten salt including a fissile material therein). In this manner, each of the functional modules may be shipped to the generation location and may include, collectively, substantially all of the systems and fluids or salts generally required to deploy the molten salt reactor system at the generation location. Further, and as described in greater detail herein, the functional modules may also be configured to reverse said deployment and support the decommissioning of the molten salt nuclear reactor system and/or repurpose the system for use at a different generation location.

To facilitate the foregoing, in one example, the molten salt nuclear reactor system described herein may include five modules: a reactor module, a cooling module, a coolant preparation module, a fuel preparation module, and a fuel shipping module. In other cases, more or fewer modules may be used. Broadly, and as described in greater detail herein, the reactor module may include various functional components of a molten salt nuclear reactor, including, without limitation, a reactor core, primary heat exchangers, a drain tank, an optional pump, among other components. The reactor module is the module in which fission reactions occur during operation of the molten salt reactor system for generation of heat. Further, the cooling module, may include the various functional components of a heat removal assembly that are associated with the molten salt nuclear reactor to remove heat generated therefrom (e.g., such as removal of heat for a specific use, including electricity generation, and so on). In this regard, the cooling module may include one or more secondary heat exchangers and associated equipment that remove heat from a primary coolant (e.g., from a coolant that is circulated between said secondary heat exchangers and the primary heat exchangers of the molten salt reactor). The reactor module and the cooling module may therefore define the main modules used or required to operate the molten salt nuclear reactor system.

The cooling preparation module, the fuel preparation module, and the fuel shipping module may be used to, among other functions, support the deployment of the molten salt nuclear reactor system to the generation location. For example, and as described in greater detail herein, the coolant preparation module may include various functional components to facilitate the transfer of a coolant salt between two systems or vessels, such as facilitating the transfer of a coolant salt between the cooling module and reactor module in order to prepare the system for operation and/or maintenance and/or decommissioning. In this regard, the coolant preparation module may include one or more pumps, chemical treatment components or subsystems, and heating capabilities to facilitate said transfers. Further, with reference to the fuel preparation module, the fuel preparation module may include various functional components to facilitate the transfer of a fuel salt between the reactor module and the fuel shipping module in order to prepare the system for operation and/or maintenance and/or decommissioning. In this regard, the fuel preparation module may also include one or more pumps, chemical treatment components or subsystems, and heating capabilities to facilitate said transfers. Further, with the reference to the fuel shipping module, this fuel shipping module may include various functional components to facilitate the storage of the fuel salt between the generation location and a fuel salt source and/or maintenance and/or decommissioning facility. In this regard, the fuel shipping module may include various containment structures, such as an inner containment structure and an outer containment structure, which may cooperate to support transport of the fuel shipping module on public roads and highways.

In one example, each of the reactor module, the cooling module, the coolant preparation module, the fuel preparation module, and the fuel shipping module may be transported to the generation location on public roads and highways and coupled with one another on site in various manners to deploy the molten salt nuclear reactor for operation at the generation location. For example, and as described in greater detail below, the cooling module, the coolant preparation module, and the fuel preparation module may be transported to a generation location. Each of the foregoing modules may generally be free of any coolant salts or fuel salts during said transport. Further, the reactor module may be transported to the generation site having a coolant salt held therein. For example, the reactor module may be transported to the generation site having a coolant salt held within the reactor vessel and/or otherwise held within a portion of the molten salt reactor that would otherwise be used to house the fuel salt during operation of the reactor. Holding the coolant salt within the reactor module in this manner may support transport of the reactor module as well as provide a mechanism for the coolant salt to reach the generation site. Further, the fuel shipping module may be transported to the generation site having a fuel salt held therein, such as within one or more containment structures that cooperate to permit the transport of the fuel salt on public roads and highways.

Once arrived at the generation location, the coolant preparation module may be coupled with the reactor module and the cooling module, and may be used to transfer the coolant salt from the reactor module to the cooling module. For example, the coolant preparation module may operate to heat, pump, and treat the coolant salt, among other functions, and thereby induce a flow of the coolant salt from the reactor module to the coolant module. The coolant salt may be induced into a primary coolant loop of the coolant module such that the coolant salt may be used to remove heat from the reactor during operation. Further, and subsequent to the removal of the coolant salt, the fuel preparation module may be coupled with the reactor module and the fuel shipping module, and may be used to transfer the fuel salt from the fuel shipping module to the reactor module. For example, the fuel preparation module may operate to heat, pump, and treat the fuel salt, among other functions, and thereby induce a flow of the fuel salt from the fuel shipping module to the reactor module. As used herein, "pump" may refer to pneumatic and/or gravity driven salt movement. The fuel salt may be induced into the reactor vessel and/or other portion of the reactor module that houses fuel salt for operation of the molten salt reactor. The coolant preparation module, the fuel preparation module, and the fuel shipping module may be uncoupled from the coolant module and the reactor module and removed from the generation location. The coolant module and reactor module may, in turn, be used to generate heat via nuclear reactions, as described herein.

In another example, and as described in greater detail herein, the reactor module, the cooling module, the coolant preparation module, the fuel preparation module, and the fuel shipping module may cooperate to support maintenance and/or decommissioning of the molten salt nuclear reactor system. After a period of operation, the reactor module and the coolant module may be considered a "used" reactor module and a "used" coolant module in that said modules have been used for a given period of heat generation via nuclear reactions. It may be desirable to remove the used reactor module and the used coolant module from the generation location, and to maintain and/or decommission said modules and optionally repurpose said modules for use at subsequent generation locations. In this regard, the coolant preparation module, the fuel preparation module, and the fuel shipping module may be supplied to the generation location having the used reactor module and the used coolant module. In one example, the fuel preparation module may be coupled with the used reactor module and the fuel shipping module and may be used to remove the fuel salt from the used reactor module and transfer said fuel salt into the fuel shipping module. To facilitate the foregoing, the fuel shipping module may heat, pump, and treat the fuel salt, among other functions, and induce a flow of the fuel salt into the fuel shipping module. Further, the coolant preparation module may be coupled with the used cooling module and the used reactor module and may be used to remove the coolant salt from the used coolant module and transfer said coolant salt into the used reactor module (e.g., transferring the coolant salt to a portion of the reactor module that held the fuel salt during operation). Such operation may serve to flush the reactor module with the coolant salt to remove any free particles, actinides, and/or other contaminants. To facilitate the foregoing, the coolant preparation module may heat, pump, and the treat the coolant salt, among other functions, and induce a flow of the coolant salt into the reactor module. In some cases, the coolant salt may be further transferred to the fuel shipping module and/or another external module to facilitate transport a reactor factory and/or maintenance and/or decommissioning facility. In some cases, the coolant salt may remain in the reactor module for transport back to the factory, decommissioning, and/or other facility.

Turning to the Drawings, FIG. 1 depicts a functional diagram of a nuclear reactor system 100 including a cooling module 110 and a reactor module 130, such as the cooling modules and the reactor modules described generally above. The nuclear reactor system 100 may operate to produce heat via nuclear reactions that occurs within the reactor module 130, and to transfer said heat to another process (e.g., electricity generation, and so on) using the cooling module 110. While many components, assemblies, and subassemblies are possible for the cooling module 110 and the reactor module 130, and are contemplated herein, the cooling module 110 is shown as generally including a secondary coolant loop module 114, a second heat exchange module 118, and a primary coolant loop module 122. Further, the reactor module 130 is shown as including a primary heat exchange module 134, a reactor control module 138, a drain tank module 142, a containment module 146, an inert gas module 150, and a fuel module 154. In other cases, the cooling module 110 and the reactor module 130 include more or fewer or different modules.

The primary heat exchange module 134, the reactor control module 138, the drain tank module 142, the containment module 146, the inert gas module 150, and the fuel module 154 of the reactor module 130 may be functional modules including or otherwise representing the functional components of a molten salt reactor. Example components of such functional modules of the molten salt reactor are described in further detail with reference to FIGS. 2 and 12-15 herein. With reference to the functions depicted in FIG. 1, the reactor control module 138 may be configured to control nuclear reactions therein and may include a moderator and other associated components to control nuclear reactions of a fissile material circulated therethrough. The primary heat exchange module 134 may be operatively coupled with the reactor control module 138 and may be configured to remove heat generated by the nuclear reactions of the reactor/reactivity control module 138. For example, the primary heat exchange module 134 may include one or more primary heat exchangers that transfer heat from a fuel salt of the reactor control module 138 to a primary coolant salt of the primary heat exchange module 134, and that transfers the coolant salt to the cooling module 110 for subsequent processing. With reference to the drain tank module 142, the drain tank module 142 may be operatively coupled to the reactor control module 138 and be configured to hold at least some of the fuel salt of the reactor module 130 in a subcritical state. In some cases, the drain tank module 142 may operate as a fail-safe module or mechanism whereby upon the occurrence of certain failure events or scenarios, the fuel salt of the reactor system defaults to the drain tank module 142 for storage in a subcritical state until such failure can be adequately resolved (e.g., as described in greater detail herein with reference to FIGS. 13-15).

With reference to the containment module 146, the containment module 146 may include one or more vessels or shields that define an environmental and personnel barrier about the primary heat exchange module 134, the reactor control module 138, and the drain tank module 142 and/or any other associated equipment, particularly those that may be salt-bearing components or otherwise have the potential to emit radiation. Further, the containment module 146 may allow the reactor module 130 to be transported to the generation location as a single integrated unit, with all functional components held therein, in order to simplify assembly and operation on site. With reference to the inert gas module 150, the inert gas module 150 may be coupled with the primary heat exchange module 134, the reactor control module 138, the drain tank module 142 and/or other modules and components that hold the fuel salt, and may be configured to provide an inert gas to such modules and components. In some cases, the inert gas module 150 may be operable to control an inert gas pressure dynamically among such modules and components to facilitate movement of fluids therebetween, as described herein. With reference to the fuel module 154, the fuel module 154 may be coupled with the reactor control module 138 and/or the drain tank module 142, and may be operable to supply a fuel salt thereto. For example, the fuel module 154 may include various pumps, valves, piping and so on to facilitate the entry of the fuel salt into the reactor module 130.

The cooling module 110 is shown in FIG. 1 as being operatively coupled with the reactor module 130 via primary coolant circulation paths 123a, 123b. As described herein, the cooling module 110 may function to remove heat from the reactor module 130 and to transfer said removed heat to another process, such as process for producing electricity, among other uses. To facilitate the foregoing, the cooling module 110 includes the primary coolant loop module 122. The primary coolant loop module 122 may include any appropriate collection of pipes, valves, instruments and so on that operate to circulate a primary coolant salt between the primary heat exchange module 134 of the reactor module 130 and the second heat exchange module 118 of the cooling module 118. For example, the primary coolant loop module 122 may include various pipes that permit the transfer of a reduced temperature coolant salt to the primary heat exchange module 134 via the primary coolant circulation path 123a. Further, the primary coolant loop module 122 may include various pipes that permit the transfer of an elevated temperature coolant salt to the second heat exchange module 118 via the primary coolant circulation path 123b. With reference to the secondary heat exchange module 118, the secondary heat exchange module 118 may include a heat removal assembly including or defined by various types of heat exchangers, including the shell and tube heat exchangers described herein. The secondary heat exchange module 118 may therefore receive an elevated temperature primary coolant salt via the primary coolant loop module 122, and remove heat therefrom in order to return the primary coolant salt to the primary coolant loop module 122 in a reduced temperature format. In this regard, the secondary heat exchange module 118 may be coupled with the secondary coolant loop module 114. The secondary heat exchange module 118 may include any appropriate collection of pipes, valves, instruments and so on that operate to circulate a second coolant salt (and/or other coolant medium) between the secondary heat exchange module 118 and another use (e.g., such as for use in another process, as described in greater detail below in reference to FIG. 16).

Figure 2:
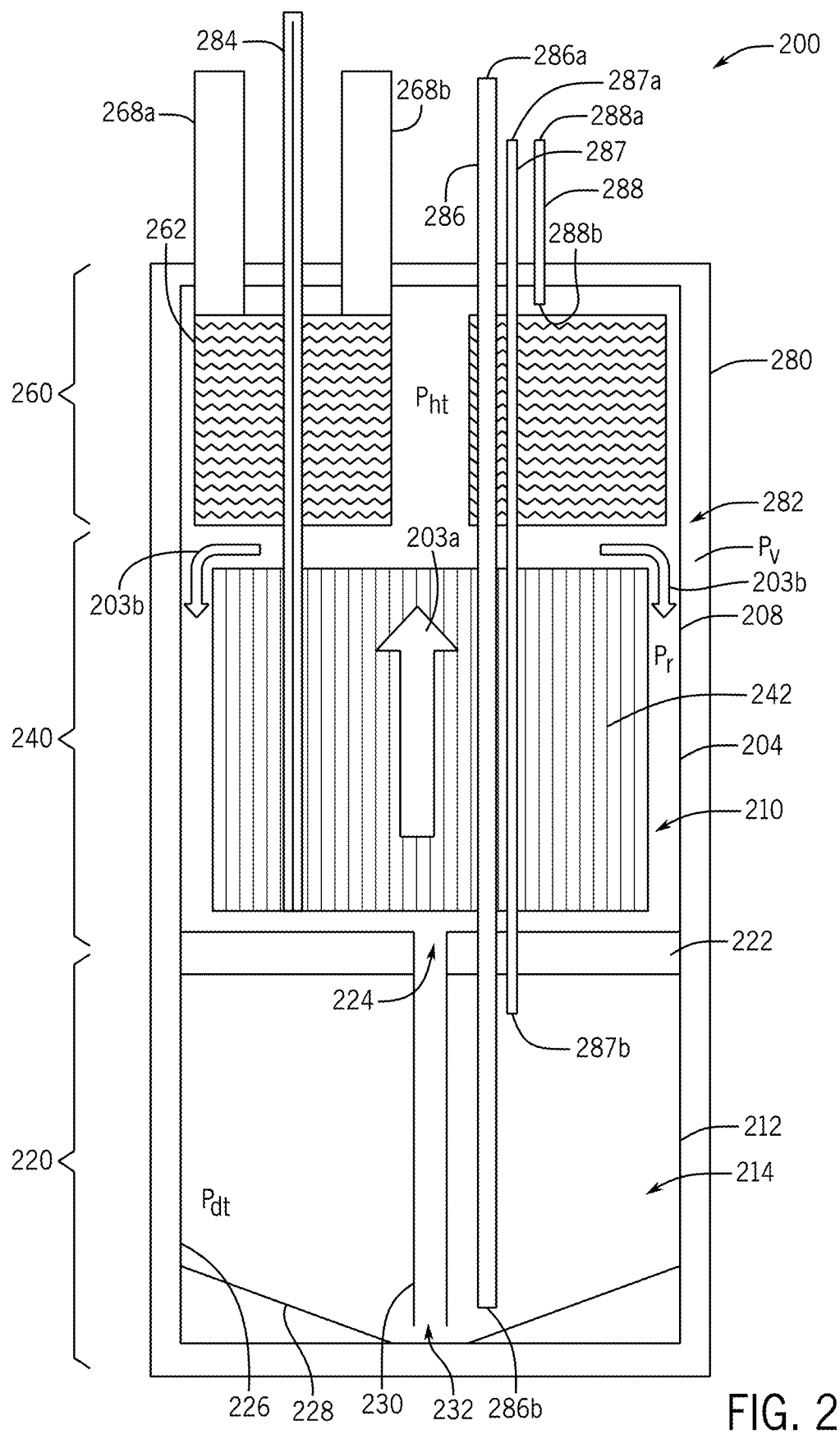
FIG. 2 depicts an example integral molten salt nuclear reactor.

While many implementations of the reactor module 130 (and any of the reactor modules described herein) are possible and contemplated herein, FIG. 2 depicts one example integral molten salt nuclear reactor 200 that may include the functional components of the integral molten salt reactor and associated reactor module, as described above in relation to FIG. 1. In this regard, turning to FIG. 2, one example deployable nuclear reactor of the reactor module 130 is shown for purposes of illustration, an integral MSR 200. Broadly, the integral MSR 200 may include an integrally constructed vessel 204, a critical region 208, a critical volume 210, a subcritical region 212, a subcritical volume 214, a drain tank section 220, an internal barrier 222, a fuel salt passage 224, a reactor section 240, and a heat exchange section 260. The common, integrally constructed vessel 204 may define both the critical region 208 and the subcritical region 212. The critical region 208 may define the critical volume 210 for the circulation of fuel salt (e.g., a carrier salt including a fissionable material, such as $LiF-BeF_2-UF_4$) and for the housing of fission reactions occurring therein. Further, the subcritical region 212 may define a subcritical volume 214 for the storage of fuel salt away from a reactor core or otherwise away from the critical region 204.

As generally shown in FIG. 2, the critical region 208 may circulate fuel salt along a circulation flow path therein including a flow 203a through a reactor section 240 where the fuel salt may generally be heated due to fission reactions occurring therein. As further shown in FIG. 2, the critical region 208 may circulate the fuel salt along a circulation path therein including a flow 203b through a heat exchange section 260 and back to the reactor section 240 for recirculation via the flow 203a. At the heat exchange section 260, heat may be removed from the fuel salt in order to circulate a cooler fuel salt back to the reactor section 240 so that the fuel salt may again be heated along the flow 203a. The circulation of the fuel salt along the flows 203a, 203b may proceed continuously in order to provide a generally constant, steady stream of heat from the fission reactions to the heat exchangers of the integral MSR 200.

The integrally constructed vessel 204 is shown in FIG. 2 as including the subcritical region 212 therein, which may establish a drain tank section 220 of the integral MSR 200. Accordingly, the integral MSR 200 may be operable to maintain fuel salt in both a critical state, and a subcritical state, within the same, integrally constructed vessel 204. The subcritical volume 214 of the subcritical region 212 is shown separated from the critical volume 210 by an internal barrier 222. The internal barrier 222 may further define a fuel salt passage 224 therethrough in order to establish a flow path for the fuel salt between the critical volume 210 and the subcritical volume 214.

Fuel salt may be selectively held within the critical volume 210 and/or the subcritical volume 214 based on the maintenance of an inert gas pressure within each volume. For example, the critical volume 210 may be held at a pressure $P_r$ (reactor section pressure) or $P_{ht}$ (heat exchange section pressure) and the subcritical volume 214 may be held at a pressure $P_{dt}$ (drain tank section pressure). In the example of FIG. 2, where fuel salt may be circulated in the critical region 208, the integral MSR 200 may operate to maintain the pressure $P_{dt}$ at a value that is greater than the pressures $P_r$, $P_{ht}$. Accordingly, the fuel salt passage 224 may be pressurized to mitigate or prevent the introduction of fuel salt into the subcritical volume 214. As described herein, the pressures $P_{dt}$, $P_r$, $P_{ht}$ may be manipulated in various manners in order to control the disposition of the fuel salt between the critical region 208 and the subcritical region 212.

FIG. 2 further shows additional implementation details of the integral MSR 200 for purposes of example. As shown in FIG. 2, the integral MSR 200 includes an outer container 280. The outer container 280 may be used to define a containment space about the vessel 204. For example, the outer container 280 may be configured to fully receive the vessel 204 and define a thermal barrier between the vessel 204 and an external environment. The vessel 204 may therefore be arranged in the outer container 280 in order to define an annular space 282 between the vessel 204 and the outer container 280. The annular space 282 may be held at a pressure $P_v$, which may be a vacuum pressure. In other cases, $P_v$ may be adapted based on the thermal requirements of the integral MSR 200. Additionally or alternatively, the annular space 282 may be configured to receive gas that may be adapted for emergency cooling of the vessel 204, among other uses.

Further, the drain tank section 220 is shown configured to hold the fuel salt in the subcritical volume 214, which may generally be defined collectively by the internal barrier 222, drain tank walls 226, and floors 228. With reference to the internal barrier 222, the internal barrier 222 may be a structural component that establishes a physical barrier and physical separation between fuel salt held in the critical volume 210 and fuel salt held in the subcritical volume 214. In this regard, the internal barrier 222 may have a sufficient strength and rigidity in order to support a weight of the fuel salt within the critical region 208 without undue deformation or encroachment of the internal barrier 222 into or toward the subcritical volume 214.

The internal barrier 222 may be adapted to permit the passage of fuel salt between the critical volume 210 and the subcritical volume 214 only via the fuel salt passage 224 defined through the internal barrier 222. In order to permit the transfer of fuel salt between the critical volume 210 and the subcritical volume 214, the drain tank section 220 may further include a transfer pipe 230. The transfer pipe 230 may extend from the fuel salt passage 222 toward floors 228 of the drain tank section 220. As shown in FIG. 2, the floors 228 may be slopped to encourage fuel salt toward the transfer pipe 230. For example, an end of the transfer pipe 230 may have a mouth 232 that is disposed adjacent to the floors 228 of the drain tank section 220. In this regard, and as described in greater detail herein, fuel salt can be transferred from the subcritical volume 214 to the critical volume 210 until said fuel salt reaches an elevational level of the mouth 232 in the subcritical volume 214.

With further reference to the reactor section 240, the reactor section 240 may be configured to receive a volume of fuel salt from the drain tank section 220 and cause fission reactions that heat the fuel salt. For example, the reactor section 240 may generally include a reactor core 242 formed at least partially from a moderator material, such as a graphite material. The reactor core 242 may cause or otherwise facilitate the undergoing fission reactions in the critical region 208. Accordingly, the reactor core 242 may be constructed in a manner to receive the fuel salt and to cause the fuel salt to be heated therein. In this regard, the reactor core 242 is shown as having one or more fuel salt passages that extends generally from a core bottom side to a core top side. As described herein, the fuel salt may be encouraged to travel through the fuel salt passage, and in so doing, the fuel salt may be heated by fission reactions. In turn, the peripheral sides of the reactor core 242 may be arranged in order to define an annulus between the reactor core 242 and the vessel 204, through which the fuel salt may travel upon removal of heat from the fuel salt at the heat exchange section 260, and for subsequent recirculation into the core 242.

With further reference to the heat exchange section 260, the heat exchange section 260 may be configured to receive a flow of the heated fuel salt from the reactor section 240 and remove heat therefrom. For example, the heat exchange section 260 is shown as having a heat exchanger 262. The heat exchanger 262 may generally take any of variety of forms in order to transfer heat from fuel salt of the critical volume 210 to a coolant salt or other medium that is held by the heat exchanger 262. Fuel salt (such as that which has been heated from one or more fission reactions) may be routed to the heat exchanger 262 and exposed to a cooler medium therein to remove heat from the fuel salt. In this regard, the coolant pipe run therein (including a cold leg 268a and a hot leg 268b shown in FIG. 2) may be in contact with the heated fuel salt that traverses through the heat exchanger 262 such that a coolant salt at an elevated temperature format (due to the transfer of heat from the fuel salt) may exit the heat exchanger 262 via the hot leg 268b.

The integral MSR 200 may further include a variety of other components to support the operation of the reactor. With continued reference to FIG. 2, the integral MSR 200 is shown as including a control rod 284. The control rod 284 may be a calibrated piece of metal that is selectively lowered and raised into the reactor 242 in order to reduce or stop a nuclear reaction occurring therein. As further shown in FIG. 2, the integral MSR 200 may include a fuel load line 286. The fuel load line 286 may be a pipe or conduit that is operable to carry a fuel salt from an environment exterior to the integral MSR 200 to the subcritical volume 214. For example, the fuel load line 286 may including a loading end 286a that is arranged outside of the outer container 280 and that is adaptable to receive a load of fuel salt therein. The fuel load line 286 may further include a dispending end 286b that is arranged within the subcritical volume 214. In this regard, the fuel salt received at the loading end 286a may be routed to through the fuel load line 286 and to the subcritical volume 214 for dispensing thereto via the loading end 286a.

As further shown in FIG. 2, the integral MSR 200 may include a pair of inert gas lines, including a subcritical gas line 287 and a critical region gas line 288. Each of the gas lines 287, 288 may be operable to control a pressure in the vessel 204. For example, the subcritical gas line 287 may have a loading end 287a that is arranged outside of the outer container 280 and operable to receive a flow of inert gas for routing to a dispensing end 287b that is arranged within the subcritical volume 214. Accordingly, a flow of inert gas can be controlled in order to control a pressure $P_{dt}$ of the subcritical volume 214, thereby controlling a pressure in the drain tank section 220. Further, the critical gas line 288 may have a loading end 288a that is arranged outside of the outer container 280 and operable to receive a flow of inert gas for routing to a dispensing end 288b that is arranged with the critical volume 210. Accordingly, a flow of inert gas can be controlled in order to control a pressure $P_{ht}$ of the heat exchange section 260 of the critical volume 210, and to control a pressure $P_r$ of the reactor section 240 of the critical volume 210. In other examples, other configurations and components of the integral MSR 200 are contemplated herein to accomplish the functionality of the various reactor modules and deployable nuclear reactors described herein.

Figure 3:
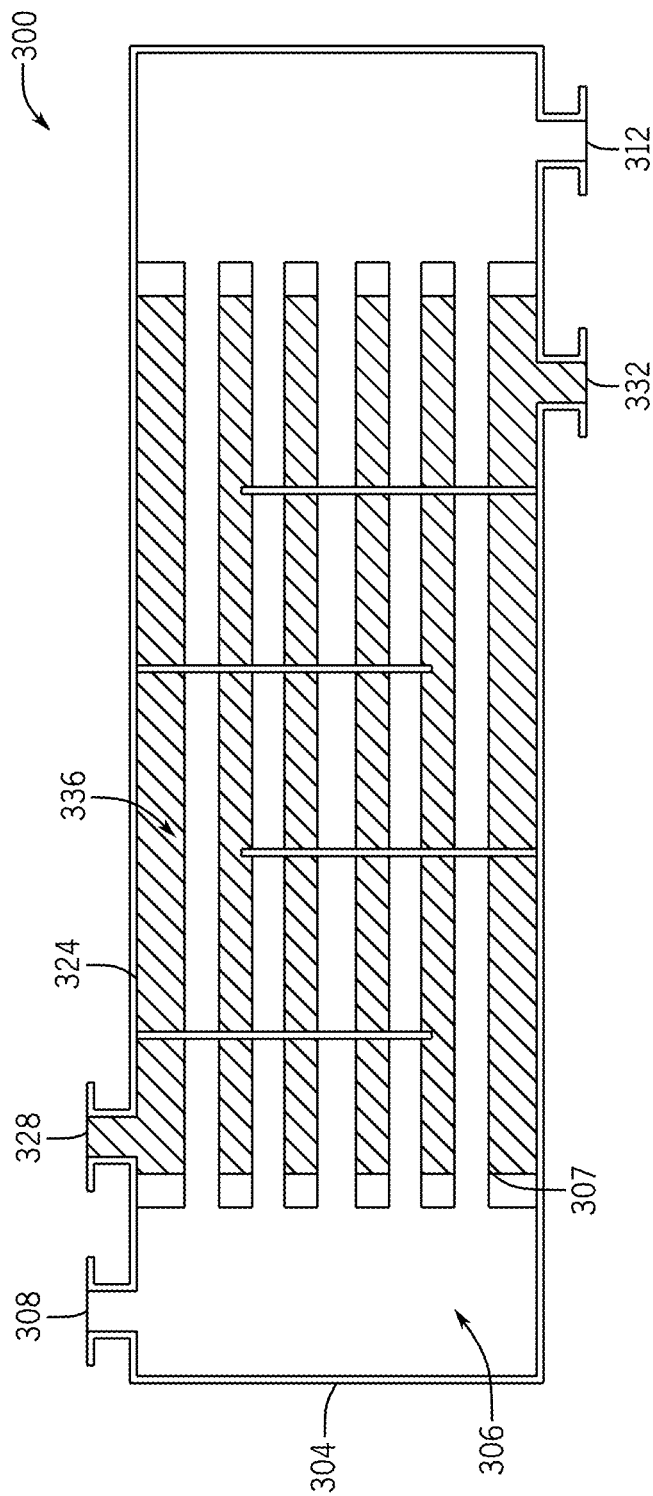
FIG. 3 depicts an example heat exchanger.

While many implementations of the cooling module 110 (and any of the cooling modules described herein) are possible and contemplated herein, FIG. 3 depicts one example heat exchanger 300 that may include the functional components of a heat removal assembly and associated cooling module, as described above in relation to FIG. 1. In this regard, turning to FIG. 3, the heat exchanger 300 is shown for purposes of illustration of one assembly or arrangement that may be used to transfer heat from a primary coolant salt to a secondary coolant salt (or other coolant medium). As shown in FIG. 3, the heat exchanger 300 may generally be defined by a shell and tube style heat exchanger having a tube portion 304 and a shell portion 324 that encompasses a center run of the tube portion 304, as described below. The tube portion 304 may be a container or vessel that defines a tube volume 306 therein. The tube 304 may further define a tube inlet 308 extending into the tube volume 306 and a tube outlet 312 extending from the tube volume 306. As shown in FIG. 3, the tube volume 306 may be divided between first and second main side portions and a series of inner tube runs 307 extending therebetween that define the central run of the tube portion 304 that is surrounded by the shell portion 324.

The heat exchanger 300 is further shown in FIG. 3 as including the shell portion 324. The shell portion 324 may generally be constructed to wrap around and encompass some or all of the inner tube runs 307. For example, the shell portion 324 may be arranged fully about the inner tube runs 307 and define a shell volume 336 (depicted in cross-hatching in FIG. 3) thereabout. FIG. 3 further shows the shell portion 324 defining a shell inlet 328 into the shell volume 336, and a shell outlet 332 extending from the shell volume 336.

In operation, a first cooling medium (e.g., the primary coolant salt or the secondary coolant salt) may be routed through the tube volume 306. Further, a second cooling medium (e.g., the other of the primary coolant salt or the secondary coolant salt) may be routed through the shell volume 336. The arrangement of the tube volume 306 being encompassed at least partially by the shell volume 336 may facilitate the transfer of heat from the hotter of the two cooling mediums to the cooler of the two cooling mediums. Accordingly, the heat exchanger 300 may be used as one or more heat exchange components of the cooling module 110, whereby the heat exchanger 300 is used to direct heat from the nuclear reactions to another process via the exchange of heat between the primary and secondary cooling salts. In other cases, other heat exchanges and components may be utilized to facilitate the foregoing functionalities of the cooling module 110 and associated exchange heat module described herein.

Figure 4:
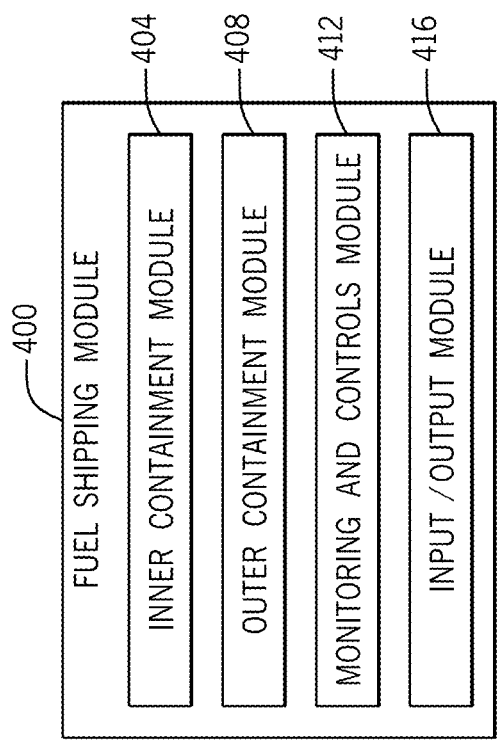
FIG. 4 depicts a functional diagram of a fuel shipping module.

With reference to FIG. 4, a fuel shipping module 400 is shown. The fuel shipping module 400 may include any of a variety of functional components configured to store fuel salt for safe and efficient transport on public roads and highways. The fuel shipping module 400 is shown functionally with reference to FIG. 4 as including an inner containment module 404, an outer containment module 408, a monitoring and controls module 412, and an input/output module 416. The inner containment module 404 may define an inner most containment and storage vessel for fuel salt held therein. The outer containment module 408 may define an exterior containment vessel or shell about the inner containment module 404. The inner containment module 404 and the outer containment module 408 may cooperate to define a containment structure that satisfies certain regulatory requirements for transporting fuel salt on public roads and highways. For example, the inner containment module 404 and the outer containment module 408 may be configured to pass certain impact, puncture, fire and water immersion tests that qualify such structures as generally being safe for nuclear fuel transport under the Nuclear Regulatory Commission and/or other relevant industry or governmental guidelines.

As further shown in FIG. 4, the monitoring and controls module 412 may be operatively coupled or associated with the inner containment module 404 and the outer containment module 408. The monitoring and controls module 412 may be configured to provide real-time information concerning the status of any fuel salt held therein, including information concerning temperature and pressure. In some cases, the fuel shipping module 400, via the monitoring and controls module 412 or other appropriate module, may be configured to actively control or compensate for pressure and/or temperature within the inner containment module 404 and/or the outer containment module 408. FIG. 4 further shows the fuel shipping module 400 including an input/output module 416, which module may be configured to facilitate the movement of any fuel salt held therein into and out from the various containment modules of the fuel shipping module 400. For example, the input/output module 416 may include or be associated with various valves and optional heaters that may cooperate to move the fuel salt as needed. In other cases, the fuel shipping module 400 may include more or fewer or different modules as may be needed for a given application.

Figure 5:
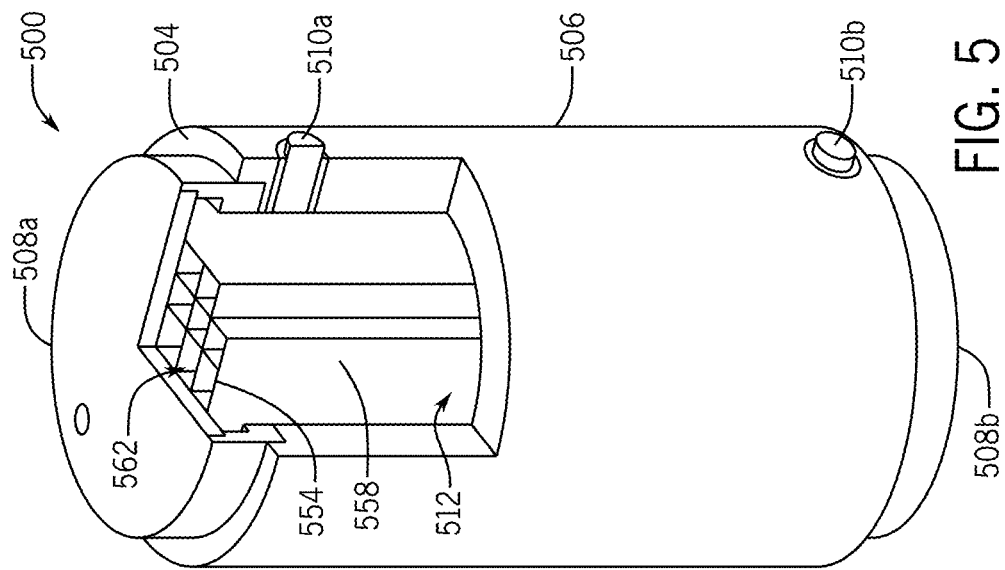
FIG. 5 depicts an example fuel shipping assembly.

While many structural configurations of the fuel shipping module 400 (and any of the fuel shipping modules described herein) are possible and contemplated herein, FIG. 5 depicts one example fuel shipping assembly 500 that may include the functional components of the fuel shipping module 400, as described above in relation to FIG. 4. In this regard, turning to FIG. 5, the fuel shipping assembly 500 may include an inner container 554 and an outer container 504. The inner container 554 may generally define the inner most containment space for fuel salt. The inner container 554 may include an inner containment structure 558 that defines an inner container volume 562. The inner containment structure 558 may be formed from a steel material, and may define a series of a channels therein to enhance rigidity of the structure. The inner containment structure 558 may further define multiple layers of shielding, including neutron shielding and gamma shielding, among other shielding layers.

The outer container 504 may be a structural outer container or other structure that is configured to withstand various impacts in order to physically protect the inner container 554 from damage. In this regard, the outer container 504 may include or be defined by an outer most cylindrical tube 506. In some cases, the cylindrical tube 506 may be formed from a concrete material and/or other material having a sufficient rigidity and thickness to withstand various impacts and immersions (e.g., fire immersion, water immersion, and so on). In this regard, the cylindrical tube 506 may define an outer container volume 512 within which the inner container 554 may be arranged. The outer container 504 may further include a top cap 508a and a bottom cap 508b that may be coupled with the cylindrical tube 506 in order to fully enclose the inner container 554 within the cylindrical tube 506. In some cases, and as shown in FIG. 5, the outer container 504 may include top access port 510a and bottom access port 510b which may be configured to permit access to the volume 512.

In operation, a fuel salt may be held and fully enclosed within the inner container volume 562 of the inner container 554. And, in turn, the inner container 554, may be held and fully enclosed within the outer container volume 512 of the outer container 504. In such arrangement, the fuel shipping assembly 500 may be configured to be transported on public roads and highways, such as via semi-trailer trucks, to a generation location. Once at the generation location, the fuel shipping assembly 500 may be unloaded from the truck and disassembled onsite. For example, at the generation location, the outer container 504 may be configured to be removed from the inner container 554, such as via crane or other lifting mechanism. In turn, and as described herein in greater detail with reference to FIGS. 6 and 7, the fuel salt held in the inner container volume 556 of the inner container 554 may be transferred to one or more reactor modules of the present disclosure.

Figure 6:
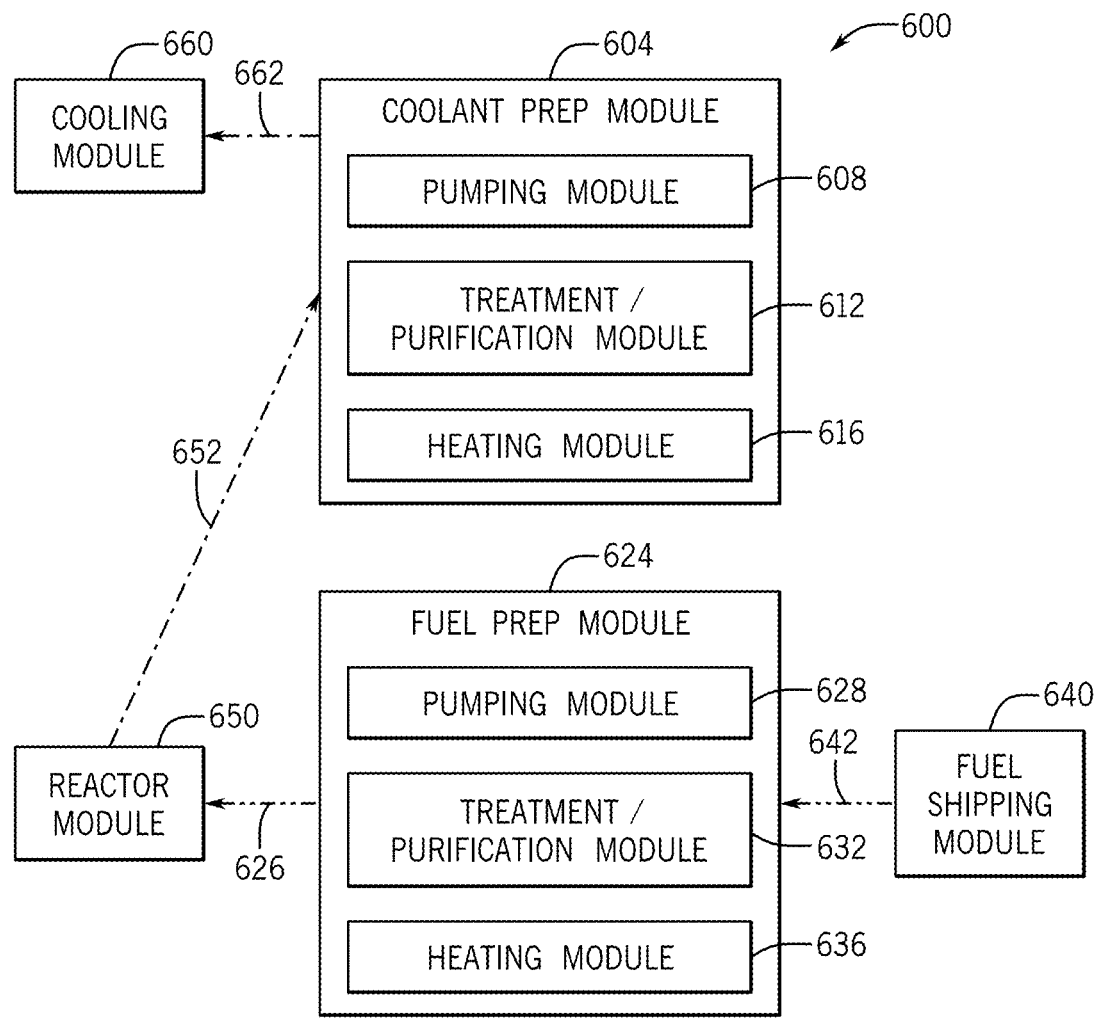
FIG. 6 depicts a functional diagram of an example deployment system for a molten salt nuclear reactor.

With reference to FIG. 6, a deployment system 600 is shown. The deployment system 600 includes a coolant preparation module 604, a fuel preparation module 624, a fuel shipping module 640, a reactor module 650, and a cooling module 660. The cooling module 660 and the reactor module 650 may be substantially analogous to the cooling module 110 and the reactor module 130 of FIG. 1, respectively; redundant explanation of which is omitted for clarity. Further, the fuel shipping module 640 may be substantially analogous to the fuel shipping module 400 of FIG. 4; redundant explanation of which is omitted here for clarity.

The coolant preparation module 604 and the fuel preparation module 624 may include any of a various of functional components that are configured to move fluids (e.g., coolant salts, fuel salt, and so on) between the cooling module 660, the reactor module 650, and the fuel shipping module 640. In this regard, with reference to the coolant preparation module 604, this module may include a pumping module 608, a treatment/purification module 612, and a heating module 616. The pumping module 608 may be configured to induce a flow of a fluid (e.g., a coolant salt) through the coolant preparation module 604, and as such, may include one or more pumps and associated equipment. Further, the treatment/purification module 612 may be configured to purify and/or chemically treat the coolant salt or other fluids flowing therethrough, and as such, may include one or more filtration devices or other devices adapted to alter a chemical or physical composition of the coolant salt. Further, the heating module 616 may be configured to heat the coolant salt or other fluid flowing therethrough, and as such, may include various heaters and associated equipment to maintain the fluid above a certain temperature.

In a similar manner, with reference to the fuel preparation module 624, this module may include a pumping module 628, a treatment/purification module 632, and a heating module 636. The pumping module 628 may be configured to induce a flow of a fluid (e.g., a fuel salt) through the fuel preparation module 624, and as such, may include one or more pumps and associated equipment. Further, the treatment/purification module 632 may be configured to purify and/or chemically treat the fuel salt or other fluids flowing therethrough, and as such, may include one or more filtration devices or other devices adapted to alter a chemical or physical composition of the fuel salt. Further, the heating module 636 may be configured to heat the coolant salt or other fluid flowing therethrough, and as such, may include various heaters and associated equipment to maintain the fluid above a certain temperature.

In operation, each of the modules of the deployment system 600 may be transported to a generation location at which the modules may be assembled and coupled in order to deploy a molten salt nuclear reactor system. The modules, collectively, may include the primary functional components and fluids (e.g., a coolant salt, a fuel salt, and so on) that may be required to operate the molten salt nuclear reactor system. The modules may be brought to the generation location via public roads and highways using semi-trailer trucks and/or other equipment and supporting vehicles. During transport, the reactor module 650 may optionally contain the coolant salt. For example, the reactor module 650 may be packed with coolant salt such the coolant salt fills the volumes of the reactor that would be filled with a fuel salt during operation of the reactor. Filling the reactor module 650 with the coolant salt in this manner may promote transport of the components of the reactor module 650 by allowing said components to be cushioned or protected from damages using the cooling salt. For example, during transport, the coolant salt may freeze therein and thus prevent relative movement of components in the reactor module 650, among other benefits. Further during transport, the fuel shipping module 640 may include the fuel salt, as described herein above in relation to FIGS. 4 and 5.

At the generation location, the coolant preparation module 604 may be used to transfer the coolant salt from the reactor module 650 to the cooling module 660. For example, the coolant preparation module 604 may be used to induce a first coolant flow 652 from the reactor module 650 into the coolant preparation module 604, and to induce a second coolant flow 662 from the coolant preparation module 604 and into the cooling module 660. For example, the coolant preparation module 604 may cause the coolant salt to flow into a primary coolant loop established by the cooling module 660. In some cases, the coolant preparation module 604 may further purify and treat the coolant salt enroute to the cooling module 660, as described herein in greater detail with reference to FIG. 8.

Further, at the generation location, the fuel preparation module 624 may be used to transfer the fuel salt from the fuel shipping module 640 to the reactor module 650. For example, the fuel preparation module 624 may be used to induce a first fuel flow 642 from the fuel shipping module 640 and into the fuel preparation module 624, and to induce a second fuel flow 626 from the fuel preparation module 624 and into the reactor module 650. For example, the fuel shipping module 640 may be manipulated or disassembled to remove an inner containment structure (that holds the fuel salt) from an outer protection containment structure. In turn, the fuel preparation module 624 may cause the fuel salt to flow into a reactor vessel and/or a drain tank of the reactor module 650. In some cases, the fuel preparation module 624 may further purify and treat the fuel salt enroute to the reactor module 650, as described herein in greater detail with reference to FIG. 7.

Figure 7:
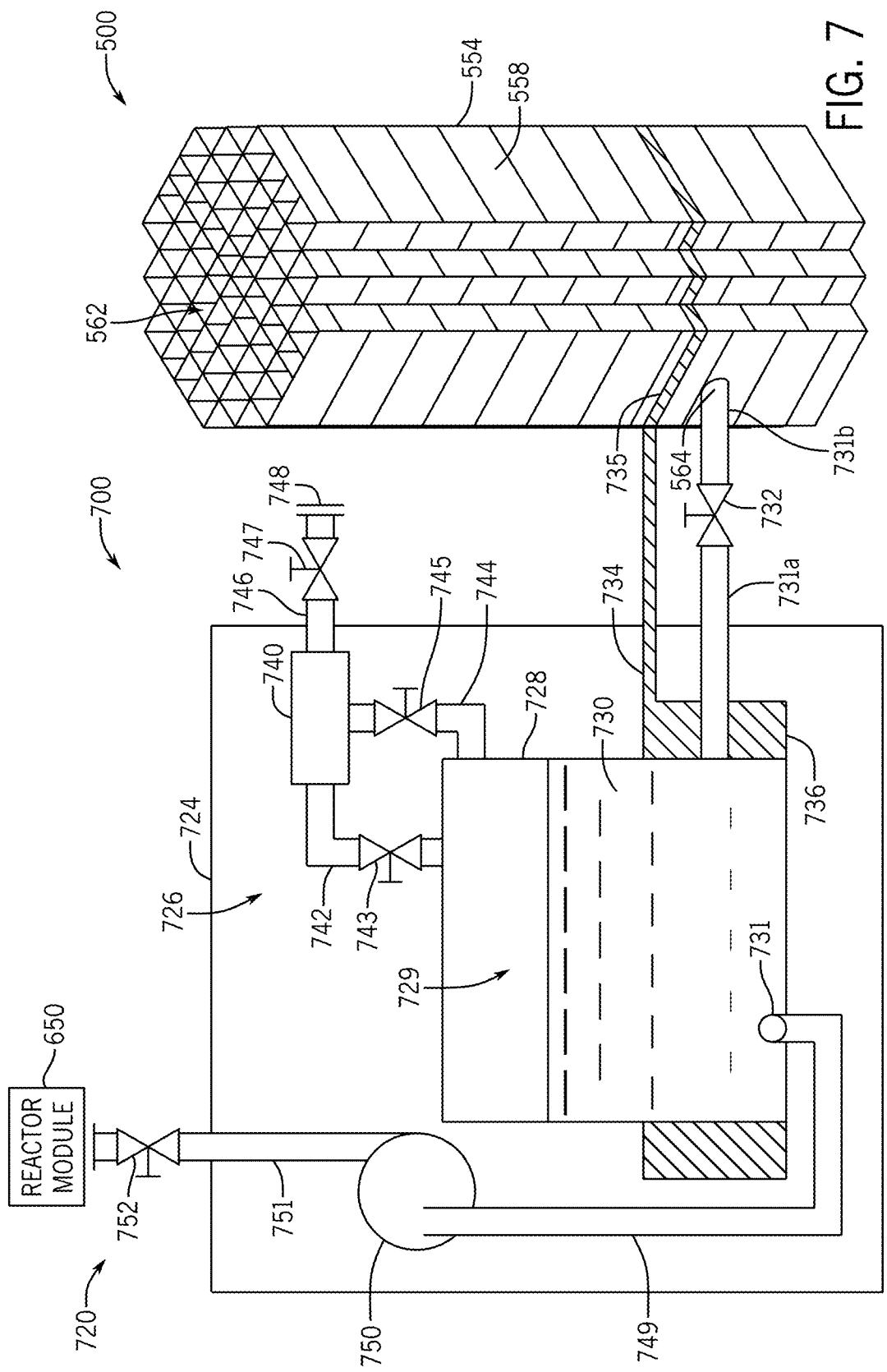
FIG. 7 depicts an example operation including a fuel preparation assembly and a containment structure of a fuel shipping assembly.

Turning to FIG. 7, an example operation 700 is shown whereby a fuel preparation assembly 720 of any of the fuel preparation modules described herein (e.g., the fuel preparation module 624) is used to transfer a fuel salt from the fuel shipping assembly 500 to the reactor module 650. As shown in FIG. 7, the fuel assembly 500 includes the inner container 554 removed from the outer container 504. For example, a crane and/or other portable onsite equipment may be used to remove the outer container 504 and expose the inner container 554 such that the fuel salt may be transported therefrom by the fuel preparation module, such as by fuel preparation assembly 720.

The fuel preparation assembly 720 may represent one example implementation of the fuel preparation module 624 described above in relation to FIG. 6. In other cases, the fuel preparation assembly 720 and fuel preparation module 624 may include more or fewer or different features. The fuel preparation assembly 720 is shown as including various components to cause the fuel salt to transfer therethrough. For example, the fuel preparation assembly 720 may include a portable container 724 defining a container volume 726. The portable container 724 may define an outermost shielding or enclosure for the functional components of the assembly 720, including a transfer tank 728 held therein. The transfer tank 728 may define a tank volume 729 that holds a quantity of fuel salt 730 therein. The transfer tank 738 may be fluidly coupled with pipe segments 731*a*, 731*b*, which are in turn fluidly couplable with the fuel shipping assembly 500 (e.g., such as via fuel transfer port 564). A control valve 732 may be provided to control a flow of the fuel salt from the fuel shipping assembly 500 into the transfer tank 728.

To facilitate the flow of fuel salt from the fuel shipping assembly 500, the fuel preparation assembly 720 may include a trace heat assembly 734, including a fuel transfer portion 735 and the transfer tank portion 736. The trace heat assembly 734 may include a collection of resistance heaters and other equipment that are operable to increase a temperature of an adjoining component. The fuel salt 730 may freeze at room temperature, and thus the fuel salt may require an elevated temperature to transfer from the fuel shipping assembly 500 to the reactor module 650. In some cases, the trace heat assembly 734 may be a temporary or removable assembly whereby at least a portion of the assembly may be selectively removable from certain equipment. To illustrate, the fuel transfer portion 735 may be selectively removable from the inner container 554 at the generation location. While FIG. 7 shows the fuel transfer portion 735 wrapped around a single band of the inner container 554 for purposes of illustration, in other cases, the fuel transfer portion 735 may be wrapped around the inner container 554 in generally any manner, including wrapped around a substantial majority of the inner container 554 as may be needed for a given application.

The transfer tank 728 may further be fluidly coupled with one or more components that operate to filter and/or chemically treat the fuel salt 730. For purposes of illustration, FIG. 7 shows a treatment unit 740 to perform such functions. The transfer tank 728 and the treatment unit 740 may cooperate to circulate fuel salt therebetween via pipe segments 742, 744, flow through which may be controlled via associated valves 743, 745. In some cases, a secondary pump or other mechanism (not shown in FIG. 7) may be integrated with the pipe segments 742, 744 to promote circulation therebetween. The treatment unit 740 may optionally be coupled with input/output piping 746 and associated valve 747 whereby the treatment unit 740 may receive chemicals, instrumentation, and the like for treating the fuel salt in the treatment unit 740 via a port 748.

The transfer tank 728 may further be fluidly coupled with one or more components that facilitate the pumping of the fuel salt 730 through the fuel preparation assembly 720 and into the reactor module 650. For example, the transfer tank 728 may include a tank outlet 731 that fluidically couples the transfer tank 728 to a pump 750 via a pipe segment 749. In turn, the pump 750 may operate to increase a pressure of the fuel salt 728 such that the fuel salt 728 is routed from the pump 750 to the reactor module via a pipe segment 751 and an associated valve 752.

Figure 8:
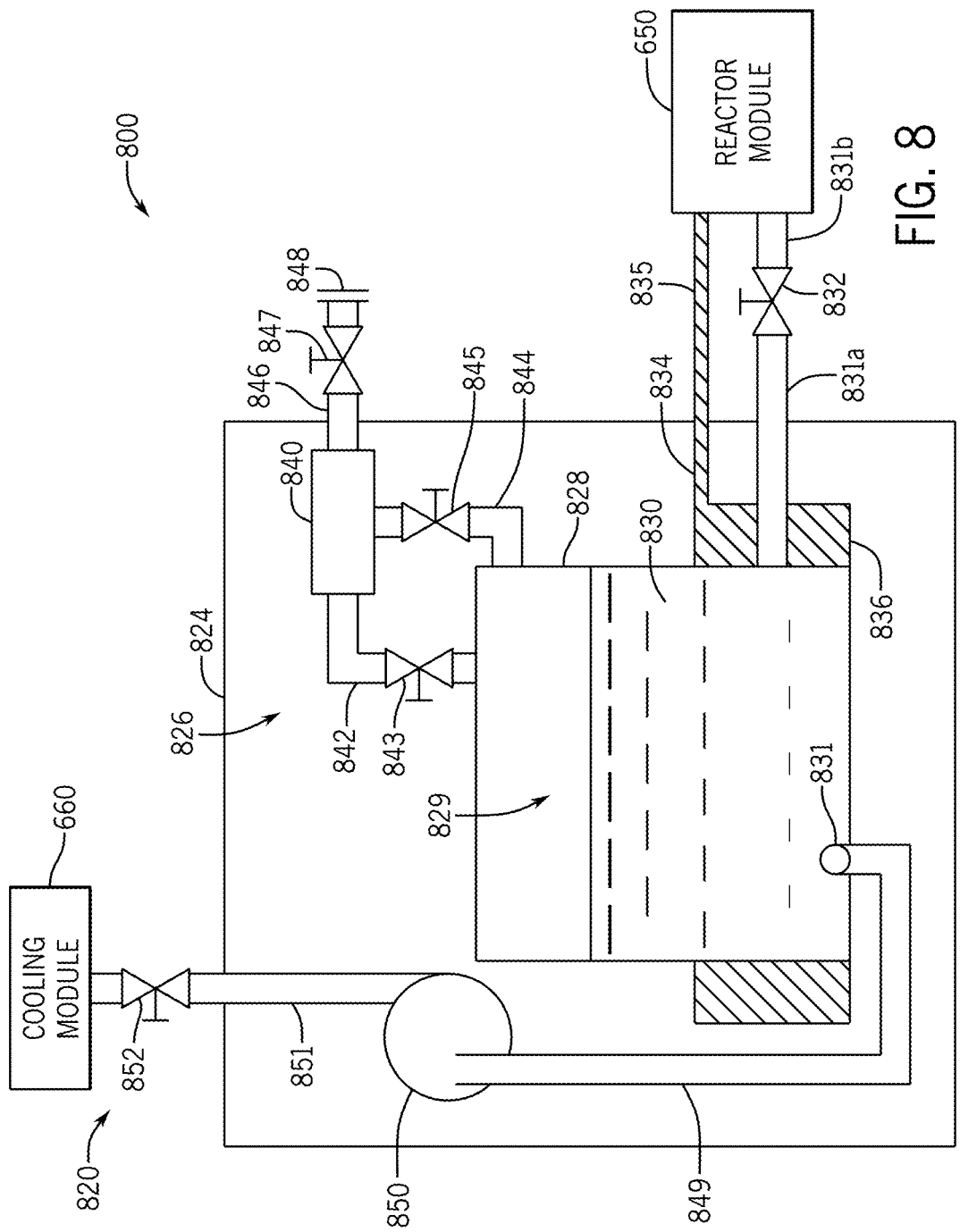
FIG. 8 depicts an example operation including a coolant preparation assembly and operatively connected reactor module and cooling module.

Turning to FIG. 8, an example operation 800 is shown whereby a coolant assembly 820 of any of the coolant preparation modules described herein (e.g., the coolant preparation module 604) is used to transfer a coolant salt from the reactor module 650 to the cooling module 660. As shown in FIG. 8, the coolant assembly 820 may, in one example, generally include the same or similar components as the fuel preparation assembly, and may therefore include a portable container 824, a container volume 826, a transfer tank 828, a tank volume 829 (shown in FIG. 8 as holding a coolant salt 830), a tank outlet 831, a trace heat assembly 834 including a coolant transfer portion 835 and a transfer tank portion 836, transfer piping 831*a*, 831*b* and associated valve 732, a purification unit 840, circulation piping segments 842, 844 and associated valves 843, 844, input/output piping 846 and associated valve 847, port 848, a pump 850 and associated pipe segments 849, 851 and associate valve 752; redundant explanation of which is omitted herein for clarity.

Notwithstanding the foregoing similarities, the coolant assembly 820 (and associated components and equipment described above) may be adapted to transfer coolant salt (as opposed to the fuel salts described in relation to FIG. 7) therethrough. In this regard, while the coolant assembly 820 may include the same or similar components as the fuel assembly 720, such components of each assembly may be adapted for service with a respective medium; e.g., the components of the fuel assembly 720 may be adapted for service and transfer of the fuel salt, and the components of the coolant assembly 820 may be adapted for service and transfer of the coolant salt.

The various modules of the deployment systems described herein may be used to facilitate maintenance and/or replacement of the cooling module, the reactor module, and/or any other modules and components used in the production of fission reactions and heat. For example, and with reference to FIG. 9, a system 900 is shown including a "used" cooling module 914 and a "used" reactor module. The used cooling module 914 may be substantially analogous to any of the cooling modules described herein, such as the cooling module 110 described above in relation to FIG. 1. Further, the used reactor module 934 may be substantially analogous to any of the reactor modules described herein, such as the reactor module 130 of FIG. 1. Notwithstanding the foregoing, the used cooling module 914 and the used reactor module 934 may be modules which have been in operation for a period of time, such as a period of months or years. Over such period of time, the fuel salt, the coolant salt, and/or potentially other fluids may require maintenance to support the continued operation of the system. In this regard, at least some of the modules of the deployment system described herein may be transported to the generation location of the used cooling module 914 and the used reactor module 934 and used to "clean up" or otherwise maintain such fluids.

Figure 9:
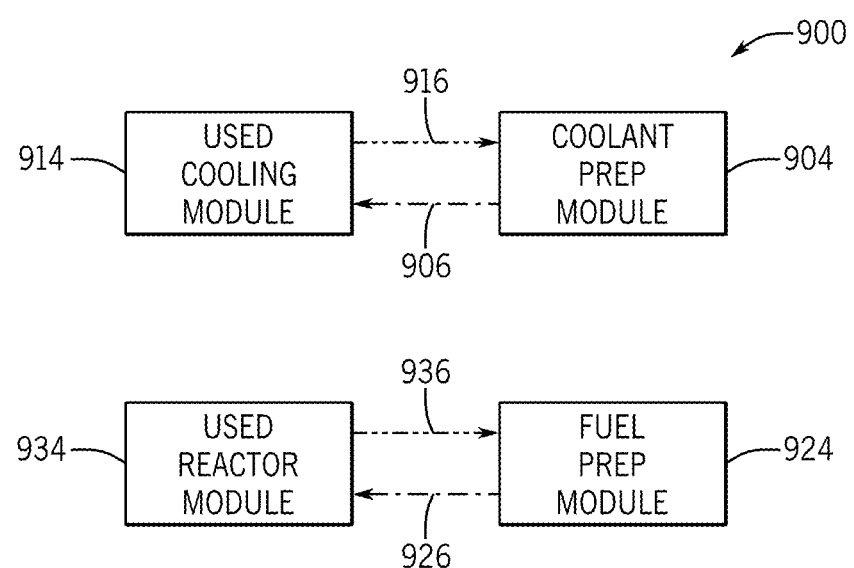
FIG. 9 depicts an example operation including maintaining fuel salt or coolant salt of a nuclear reactor system.

In this regard, FIG. 9 shows the system 900 as including a coolant preparation module 904 and a fuel preparation module 924. The coolant preparation module 904 and the fuel preparation module 924 may be substantially analogous to any of the coolant preparation modules and fuel preparation modules described herein, such as the coolant preparation module 604 and the fuel preparation module 624, respectively; redundant explanation of which is omitted herein for clarity. In operation, and as shown in FIG. 9, the coolant preparation module 904 may be operatively coupled with the used cooling module 914 to clean up the coolant salts circulated therein. For example, the used cooling module 914 and the coolant preparation module 904 may be operatively coupled such that a first flow of coolant salt 916 is provided to the coolant preparation module 904 from the used cooling module 914, and further such that a second flow coolant salt 906 is provided to the used cooling module 914 from the coolant preparation module 904. In some cases, the first flow of coolant salt 916 may be a flow of coolant salt that requires treatment, such as purification or chemical treatment. In this regard, the coolant preparation module may receive the first flow of coolant salt 916 and conduct one or more purification or treatment operations on the coolant salt, such as described above in relation to FIG. 6. In turn, the second flow of coolant salt 906 may be a "cleaned up" flow of coolant salt that results from such purification or treatment operations in the coolant preparation module 904. It will be appreciated that the first flow of coolant salt 916 and the second flow of coolant salt 906 may be repeatedly cycled through the used cooling module 914 and the coolant preparation module 904 for a continuous or cumulative purification or treatment of the coolant salt, until such coolant salt reaches desired parameters. In this manner, rather than replacing the used cooling module 914 or the coolant salt therein, the coolant preparation module 904 may be brought to the generation location to maintain the coolant salt so that used cooling module 914 may continue operation.

In operation, and as shown in FIG. 9, the fuel preparation module 924 may be operatively coupled with the used reactor module 934 to clean up the fuel salts circulated therein. For example, the used reactor module 914 and the fuel preparation module 924 may be operatively coupled such that a first flow of fuel salt 936 is provided to the fuel preparation module 924 from the used reactor module 934, and further such that a second flow fuel salt 926 is provided to the used reactor module 934 from the fuel preparation module 924. In some cases, the first flow of fuel salt 936 may be a flow of fuel salt that requires treatment, such as purification or chemical treatment. In this regard, the fuel preparation module may receive the first flow of fuel salt 936 and conduct one or more purification or treatment operations on the fuel salt, such as described above in relation to FIG. 6. In turn, the second flow of fuel salt 926 may be a "cleaned up" flow of fuel salt that results from such purification or treatment operations in the fuel preparation module 924. It will be appreciated that the first flow of fuel salt 936 and the second flow of fuel salt 926 may be repeatedly cycled through the reactor module 934 and the fuel preparation module 924 for a continuous or cumulative purification or treatment of the fuel salt, until such fuel salt reaches desired parameters. In this manner, rather than replacing the used reactor module 914 or the fuel salt therein, the fuel preparation module 924 may be brought to the generation location to maintain the fuel salt so that used reactor module 934 may continue operation.

Figure 10A:
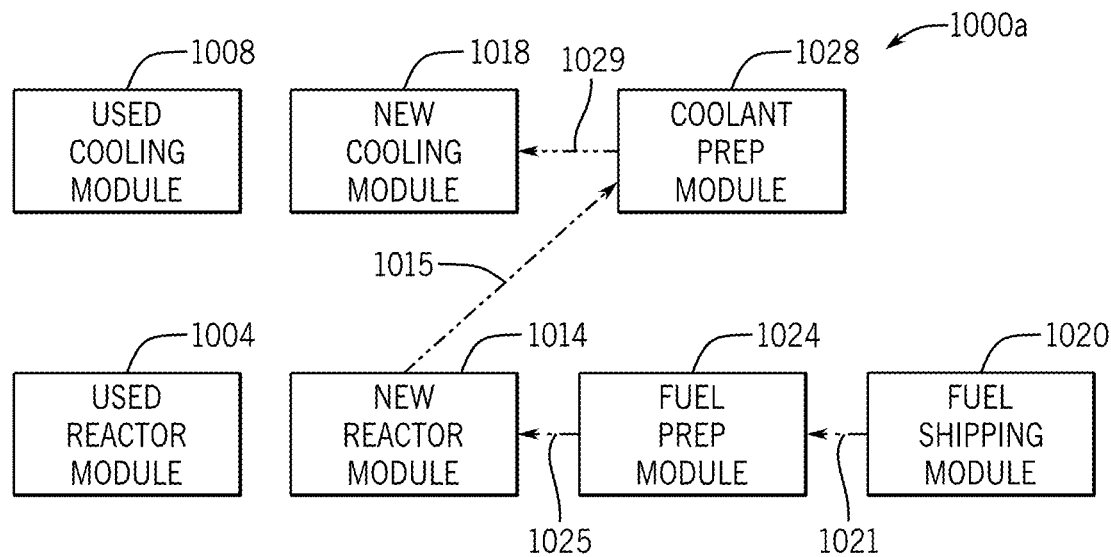
FIG. 10A depicts an example operation including replacing a reactor module and a cooling module.
Figure 10B:
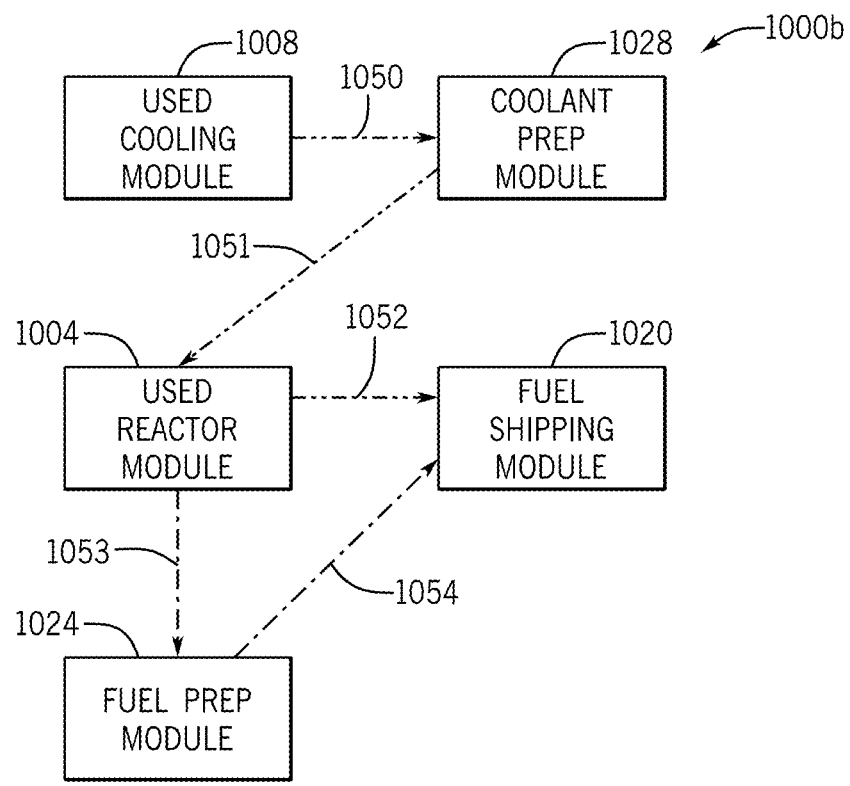
FIG. 10B depicts an example operation including preparing a used reactor module and a used cooling module for decommissioning.

Turning to FIGS. 10A and 10B, the various modules of the deployment system described herein may be used to facilitate maintenance, replacement and decommissioning of certain used cooling modules and used reactor modules. For example, and as shown in FIG. 10A, a system 1000a is shown including a used cooling module 1008 and a used reactor module 1004. The used cooling module 1008 and the used reactor module 1004 may be substantially analogous to the used cooling module 914 and the used reactor module 934 described above in relation to FIG. 9. Notwithstanding the foregoing similarities, it may be desirable to replace the used cooling module 1008 and the used reactor module 1004 with new cooling and reactor modules, respectively. In this regard, the system 1000a shows a new cooling module 1018, a new reactor module 1014, a coolant preparation module 1028, a fuel preparation module 1024, and a fuel shipping module 1020 (collectively, the "Deployment Modules"). The Deployment Modules may be transported to the generation location and proximal to the used cooling module 1008 and the used reactor module 1004 to facilitate the deployment of the new cooling module 1018 and new reactor module 1014, while also facilitating the maintenance and/or decommissioning of the used cooling module 1008 and the used reactor module 1004. For example, the Deployment Modules may engage in an operation similar to that operation described in relation to FIG. 6 whereby the coolant preparation module 1028 is used to transfer coolant salt from the new reactor module 1014 to the new cooling module 1018 via a first coolant salt flow 1015 and a second coolant salt flow 1029. Further, the Deployment Module may, similar to the operation described in relation to FIG. 6, operate the fuel preparation module 1024 to transfer a fuel salt from the fuel shipping module 1020 to the new reactor module 1014 via a first fuel salt flow 1021 and a second fuel salt flow 1025. In this regard, the coolant preparation module 1028 and the fuel preparation module 1024 may operate to prepare the new cooling module 1018 and the new reactor module 1014 for operation in the generation of heat via nuclear reactions, as described in relation to FIG. 6.

Further, and as shown in system 1000b of FIG. 10B, the coolant preparation module 1028, the fuel preparation module 1024 and the fuel shipping module 1020 of FIG. 10A may be used to maintain and/or decommission the used cooling module 1008 and the used reactor module 1004. For example, the coolant preparation module 1028 may be operatively coupled with the used cooling module 1008 and the used reactor module 1004. The coolant preparation module 1028 may be used to transfer a used coolant salt from the used cooling module 1008 to the used reactor module 1004 via used coolant salt flows 1050, 1052. Such transferring of the used coolant salt may serve to flush the reactor module 1004 with the used coolant salt to remove any radionuclides, among other contaminants. Further, the fuel preparation module 1024 may be operatively coupled with the used reactor module 1004 and the fuel shipping module 1020. The fuel preparation module may be used to transfer a used fuel salt from the used reactor module 1004 to the fuel shipping module 1020 via the used fuel salt flows 1053, 1054. Such transferring of the used fuel salt may serve to optionally treat the fuel salt prior to transfer to a maintenance and/or decommissioning and/or waste facility and/or other appropriate facility. In some cases, the used coolant salt and/or the used fuel salt may be routed directed from the used reactor module 1004 to the fuel shipping module 1020 via fluid flow 1052, as may be appropriate for a given application.

Figure 11A:
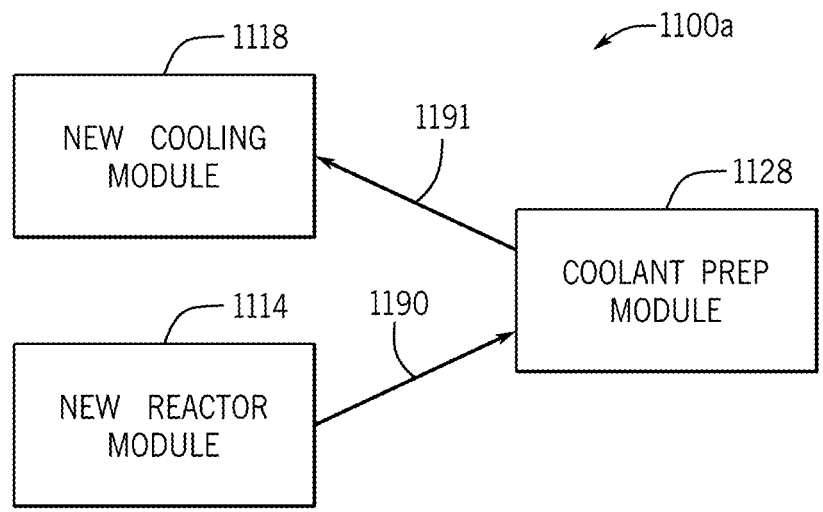
FIG. 11A depicts an example operation including transferring a coolant salt from a new reactor module to a new cooling module.
Figure 11B:
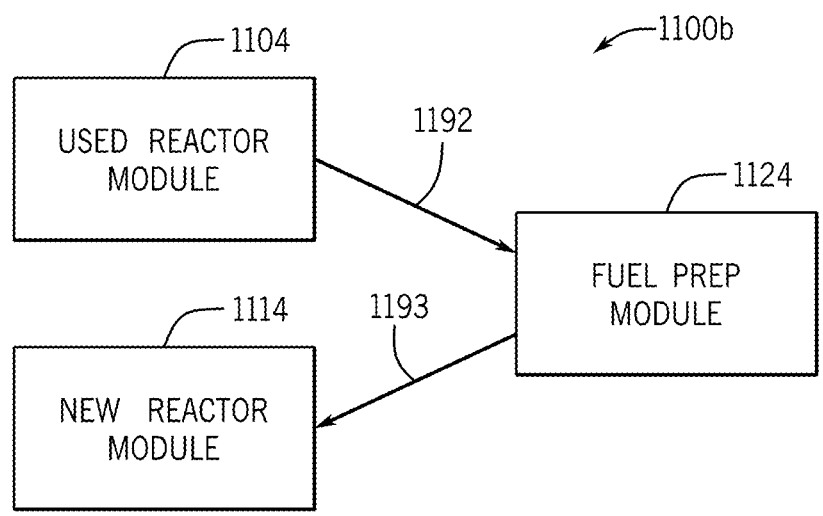
FIG. 11B depicts an example operation including transferring a used molten salt from a used reactor module to a new reactor module.
Figure 11C:
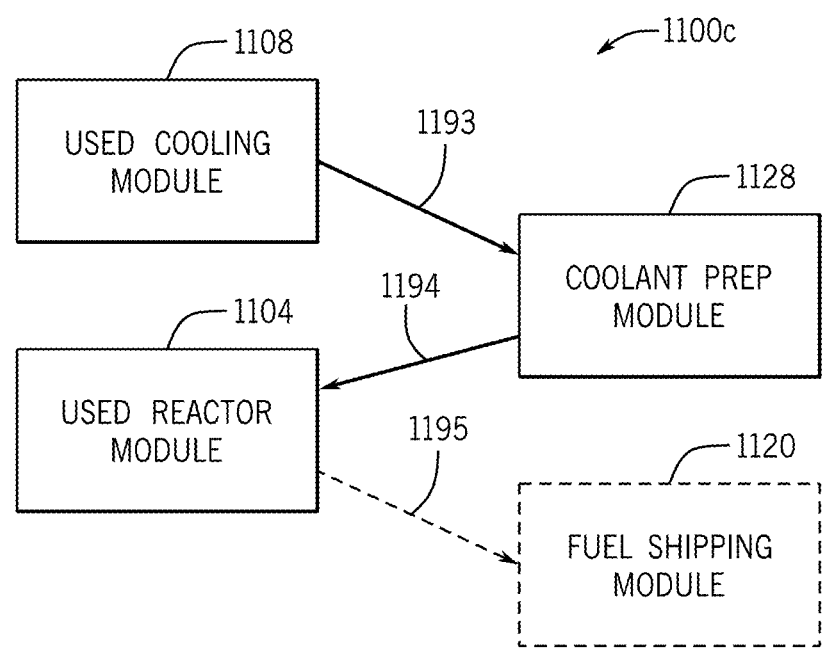
FIG. 11C depicts an example operation include transferring a used coolant salt from a used cooling module to a used reactor module.

Turning to FIGS. 11A-11C, the various modules of the deployment system described herein may be used to facilitate the reuse of a molten salt material. For example, a new cooling module and a new reactor module may be shipped to a deployment site at which a used reactor module may operate. The used molten salt of a used reactor module may be reconditioned, reused, and repurposed for use in a new reactor module. Accordingly, the new reactor module need not include or be shipped with new molten salt, thereby limiting waste streams and efficiently utilizing the existing molten salt supply at the deployment site.

In one example, and with continued reference to FIGS. 11A-11C, a new cooling module 1118 and a new reactor module 1114 may be shipped to a deployment site for replacement of a used reactor module 1104 and a used cooling module 1108, respectively. A coolant prep module 1128, a fuel prep module 1124, and a fuel shipping module 1120 may also be shipped to the deployment site to facilitate the replacement of the used reactor module 1104 and used cooling module 1108 and reuse of the used molten salt, as described herein. The cooling modules 1118, 1108, the reactor modules 1114, 1104, the coolant prep module 1128, the fuel prep module 1124, and the fuel shipping module 1120 may be substantially analogous to any of the cooling modules, reactor modules coolant prep modules, fuel prep modules, and fuel shipping modules, respectively, described herein; redundant explanation of which is omitted herein for clarity. With reference to operation 1100a shown in FIG. 11A, the new reactor module 1114 may be shipped to the deployment site having a coolant salt held therein. In this regard, the coolant preparation module 1128 may be operable to induce a first coolant salt flow 1190 from the new reactor module 1114 to the coolant prep module 1128, and a second coolant salt flow 1191 from the coolant prep module 1128 to the new cooling module 1118, according to the techniques described herein. In this regard, upon completion of the operation 1100a, the coolant salt may be removed from the new reactor module 1114 and placed in a form suitable for use in the new cooling module 1118. It will be appreciated that in some cases, the operation 1100a may be optional, for example, such as where the coolant is shipped to the deployment site via a means other than the new reactor module 1114 and/or the coolant of the used coolant module 1108 is optionally reused.

With reference to FIG. 11B, operation 1100b is shown in which the fuel prep module 1124 is used to transfer molten salt from the used reactor module 1104 into the new reactor module 1114. For example, the fuel prep module 1124 may be used to induce a first flow 1192 of molten salt to the fuel prep module 1124, and a second flow 1192 of molten salt from the fuel prep module 1124 to the new reactor module 1114, according to the techniques described herein. In this regard, upon completion of the operation 1100b, the used molten salt may be removed from the used reactor module 1104 and placed in a form suitable for use in the new reactor module 1114. As such, operation of the new reactor module 1114 does not necessarily require shipment of new molten salt/new fissile material to the deployment site.

With reference to FIG. 11C, operation 1100c is shown in which the coolant prep module 1127 is used to flush the used reactor module 1104 with the used coolant of the used cooling module 1108. For example, the coolant prep module 1128 may be used to induce a first flow 1193 of used coolant to the coolant prep module 1128, and a second flow 1194 of used coolant from the coolant prep module 1128 to the used reactor module 1104, according to the techniques described herein. In this regard, upon completion of the operation 1100c, the used coolant salt may be removed from the used cooling module 1108 and used to flush the used reactor module 1104 to remove any radionuclides, among other contaminants. The used coolant salt may be shipped to a decommissioning or other facility within the used reactor module 1104 or optionally transferred to the fuel shipping module 1120 via a third flow 1195 of used coolant.

Figure 12:
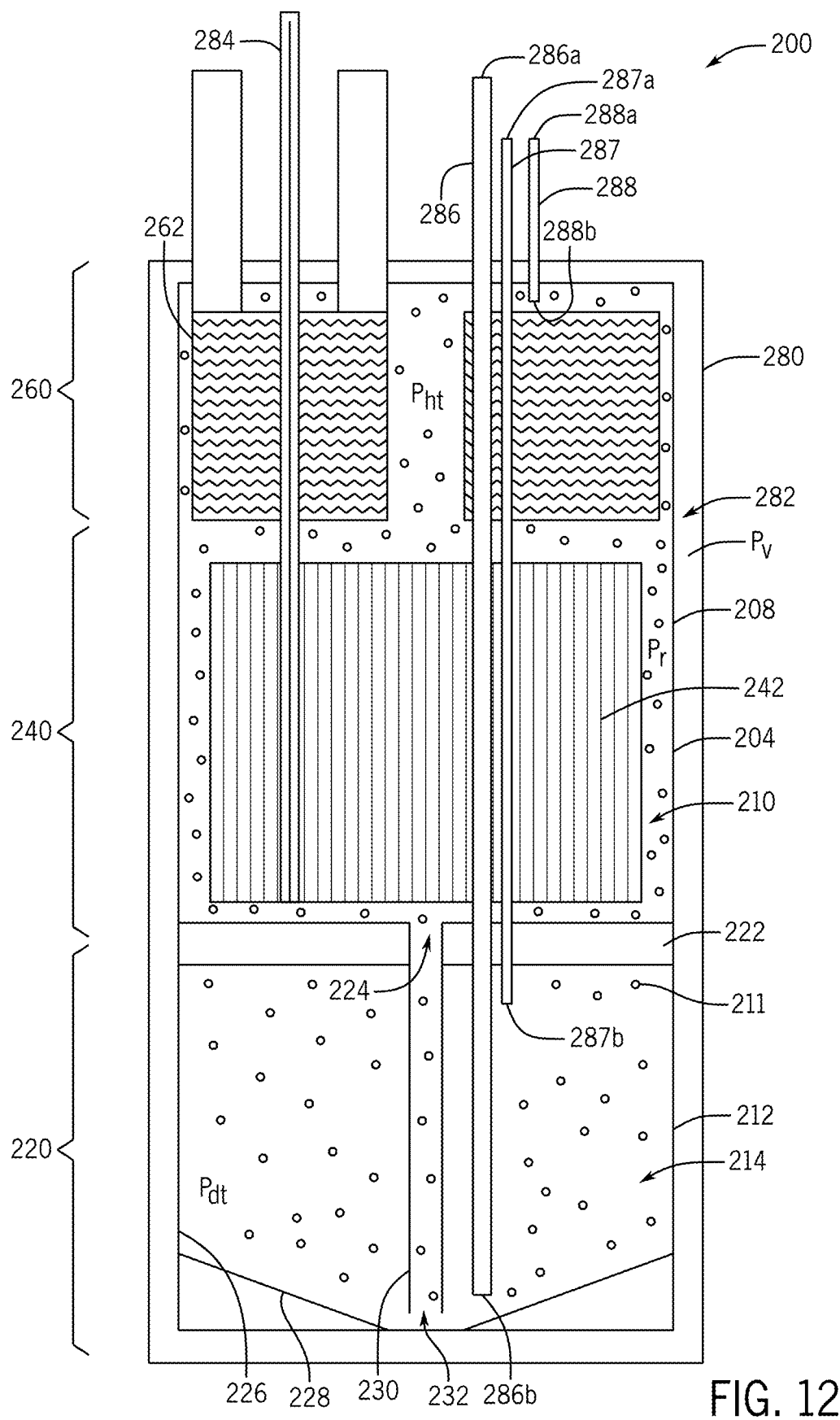
FIG. 12 depicts the example integral molten salt nuclear reactor of FIG. 2 including a coolant salt therein.

With reference to FIG. 12, FIG. 12 depicts the integral molten salt nuclear reactor 200 of FIG. 2 including a coolant salt 211 held therein. As described herein, the reactor modules of the present disclosure, which may include some or all of the components of the integral molten salt nuclear reactor 200, may be packed with the coolant salt 211 during transport of the reactor module to the generation location. For example, and as shown in FIG. 12, the coolant salt 211 may be packed into the vessels and components that would typically house the fuel salt during operation of the reactor. At the generation location, said coolant salt 211 may be removed from the integral molten salt reactor 200, according to the method described herein. For example, one or more coolant preparation modules may be coupled with the integral molten salt nuclear reactor 200 and used to remove the coolant salt 211 therefrom, and to transport said coolant salt 211 to a cooling module, as described herein.

Figure 13:
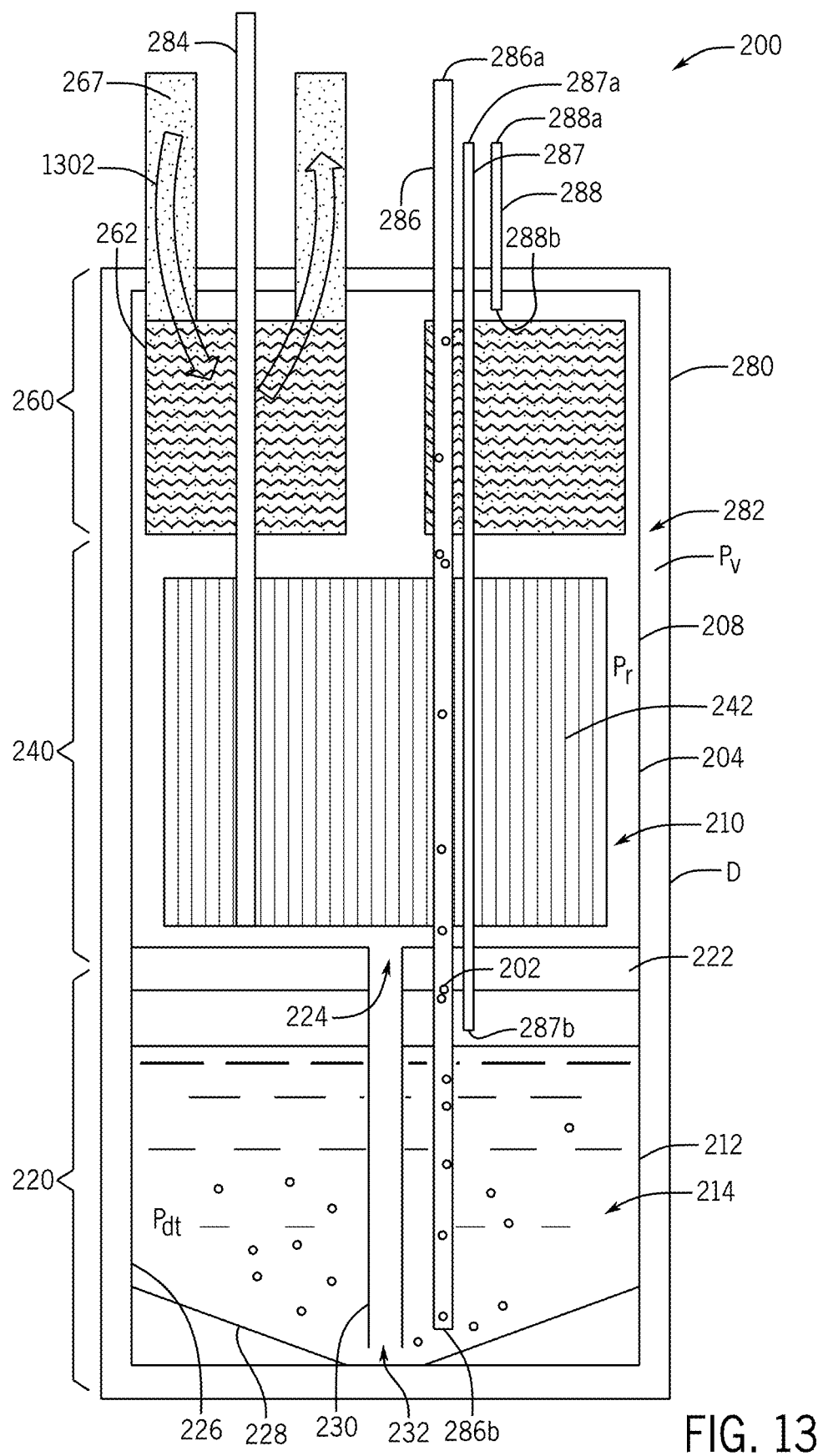
FIG. 13 depicts the example integral molten salt nuclear reactor of FIG. 2 in a first operational configuration.

In operation, the integral MSR 200 (or any other integral molten salt reactor of various reactor modules described herein) may be used to selectively control a disposition of the fuel salt 202 as between the critical volume 210 and the subcritical volume 214. The integral MSR 200 may further in operation be used to generate heat through fission reactions, which heat may be removed through the continuous circulation of fuel salt with the critical volume 210 and through the heat exchange section 260. In this regard, for the sake of illustration, FIG. 13 depicts the integral MSR 200 in a first configuration D. In the first configuration D, the integral MSR 200 may use a coolant salt or gas to heat the vessel 204. For example, the coolant salt 267 may be routed through the heat exchanger 262 along circulation path 1302. On startup, in the configuration D shown in FIG. 13, the coolant salt 267 may have an elevated temperature profile as compared to an ambient temperature of the vessel 204, thereby permitting the coolant salt 267 to heat the vessel 204 in the configuration D. In some cases, a heated gas may be used in place of the coolant salt 267 to heat the vessel 204. As is further shown in the first configuration D, the fuel salt 202 may be loaded into the subcritical region 214. For example, the fuel 202 salt may be introduced into the fuel load line 286 and caused to flow into the subcritical volume 214 via the fuel load line 286.

Figure 14:
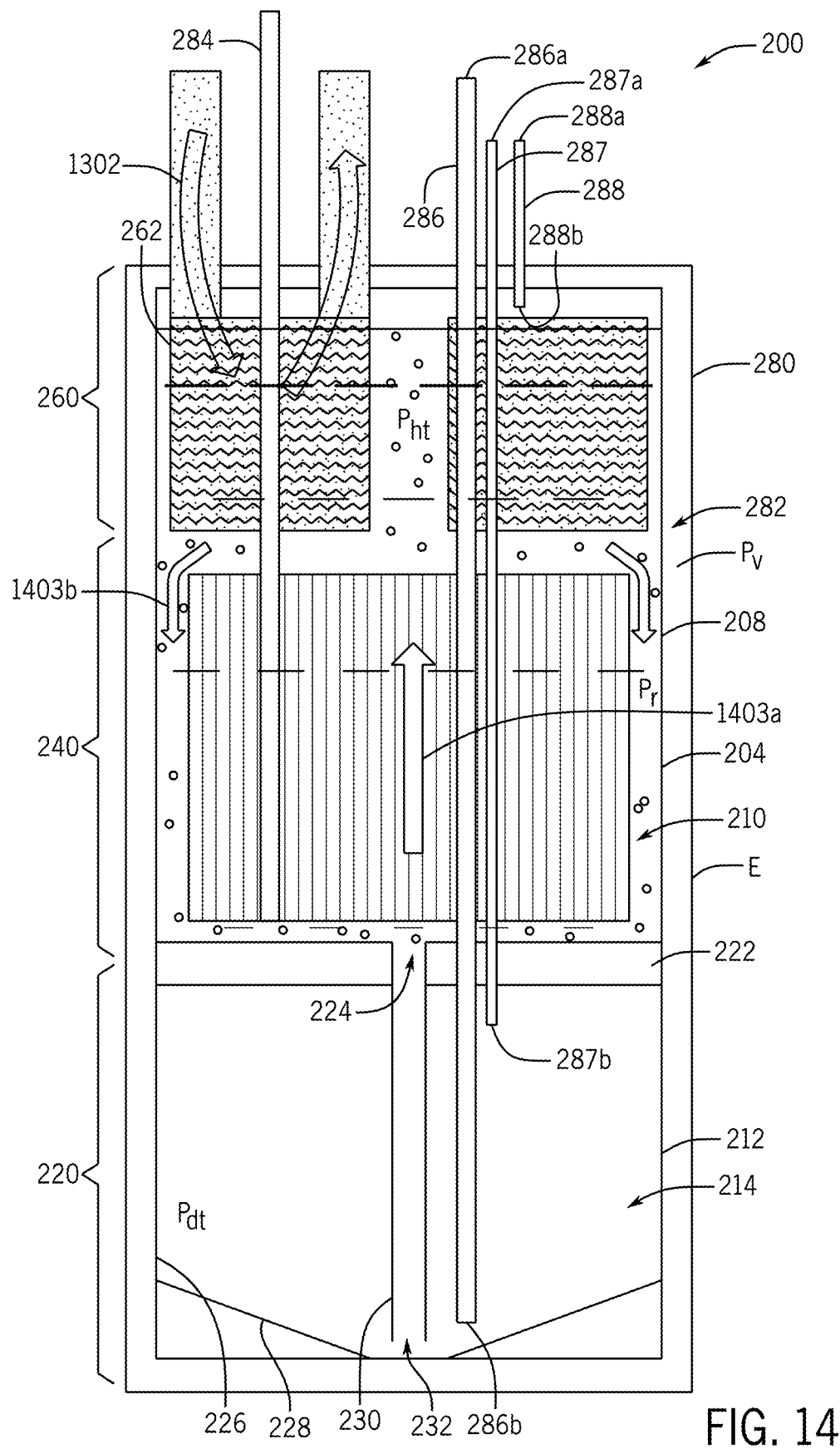
FIG. 14 depicts the example integral molten salt nuclear reactor of FIG. 2 in a second operational configuration.

The integral MSR 200 may be further operable to cause the fuel salt 202 to selectively transfer from the subcritical region 214 to the critical region 210. For example, the inert gas lines 287, 288 may be operated in order to control a pressure in each of the critical volume 210 and the subcritical volume 214 and to create a pressure differential therebetween that causes the selective transfer of fuel salt between the critical and subcritical volumes 210, 214. To illustrate, FIG. 14 shows a loading of the fuel salt 202 into the critical volume 210 from the subcritical volume 214 and operation of the integral MSR 200 in a second configuration E. To accomplish said loading, inert gas may be provided to the subcritical region gas line 287 in order to cause the pressure $P_{dt}$ of the subcritical region 212 to increase relative to the pressures $P_{ht}$, $P_r$ of the critical region 210. The fuel salt 202 held with the subcritical volume 214 may be exposed to both the pressure $P_{dt}$ and the pressure $P_r$ (via the transfer pipe 230). Accordingly, the pressure differential as between $P_{dt}$ and $P_r$ may induce a flow of the fuel salt 202 from the subcritical volume 214 (having a higher pressure) to the critical volume 210 (having a lower pressure) that causes the fuel salt 202 to transfer from the subcritical volume 214 to the critical volume 210 via the transfer pipe 230. In order to maintain the fuel salt 202 in the critical volume 214, the pressure $P_{dt}$ may be maintained at a higher pressure than either $P_r$ or $P_{ht}$ during the operation of the reactor. Upon entry of the fuel salt 202 into the critical region 208, the fuel salt 202 may be circulated along a circulation path 1403a extending up through the reactor core 242 where the fuel salt 202 may undergo a fission reaction that heats the fuel salt 202. The fuel salt 202 may be received by the heat exchanger 262 of the heat exchange section 260 from the circulation path 1403a in order to remove the heat from the fuel salt 202, such as via the coolant salt 267 traversing the circulation path 1302, as described herein). Subsequently, the fuel salt may proceed along a circulation path 1403b that extends along a periphery of reactor 242 in order to return the fuel salt 202 to the reactor core 242 for further fission reactions, operating a continuous loop in this manner during operation of the integral MSR 200.

Figure 15:
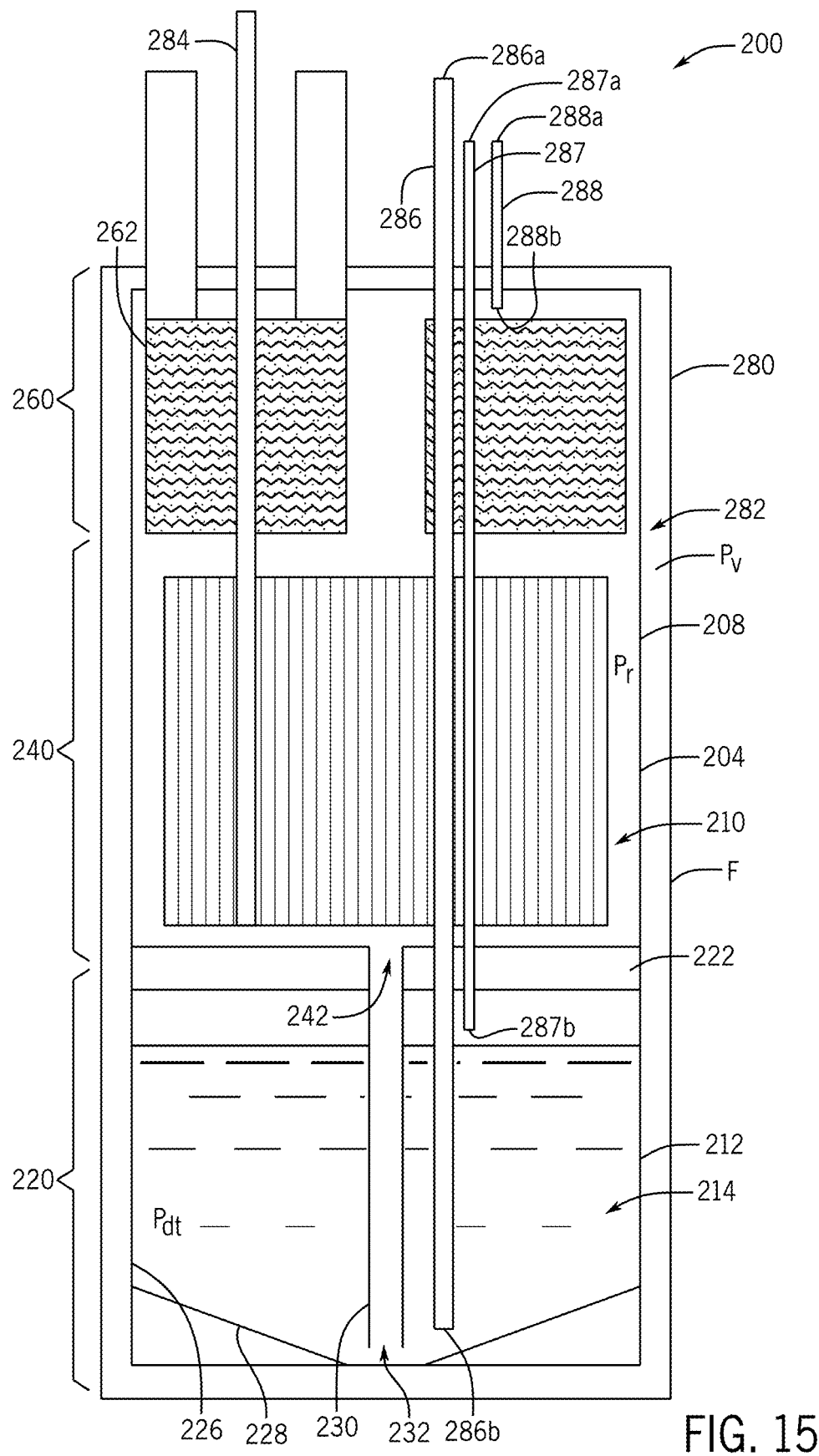
FIG. 15 depicts the example integral molten salt nuclear reactor of FIG. 2 in a third configuration.

The configuration E of the integral MSR 204 shown in reference to FIG. 14 may be considered an active state of the reactor because the configuration E requires the ongoing, continuous pressurization of the fuel salt passage 224 in order to retain the fuel salt 202 in the critical region 208. Upon depressurization of the fuel salt passage 224 (and upon depressurization of the subcritical volume 214 more generally), the fuel salt 202 may flow, passively and gravitationally from the critical volume 210 to the subcritical volume 214 via the fuel salt passage 224. In this regard, FIG. 15 shows a third configuration F of the integral MSR 200 in which the fuel salt 202 is caused to flow from the critical volume 210 to the subcritical volume 214. For example, the subcritical region gas line 287 and the critical region gas line 288 may be operational in order to cause the pressure $P_{dt}$ to be less than or equal to the pressures $P_r$, $P_{ht}$. On the establishment of such pressures, the fuel salt 202 may no longer be prevented from entering the drain tank section 220, and may therefore flow freely thereto. On flowing freely into the drain tank section 220, the fuel salt 202 may be positioned away from the reactor core 242 and/or generally away from components of the integral MSR 200 that may otherwise cause the fuel salt 202 to be heated. In this regard, the fuel salt 202 may be allowed to be cooled and stored safely during a shutdown event in the subcritical volume 214. Further, the change in pressure $P_{dt}$ may be caused by either an intentional event (e.g., such the lowering of the pressure $P_{dt}$) or an unintentional event (e.g., an emergency loss of power or other event that results in the failure of the integral MSR 200 to maintain the pressure $P_{dt}$). Accordingly, the drain tank section 220 may serve as a passive safety system that collects the fuel salt 202 away from the reactor core 242 during an emergency event because said emergency event causes the fuel salt 202 to be routed to subcritical geometry of the drain tank section 220 by default.

The containment system 200, as shown in FIGS. 13-15 provides a passive safety systems for the integral MSR 200 that operates, passively, in each of the configurations D-F described above. For example, the containment system 280 provides the containment volume 282 fully about the integral MSR 200 so that the integral MSR 204 is fully enclosed therein. The containment volume 282, in some cases, may be filled with the fission product adsorbing/absorbing material. In this regard, in the event of a release event of gas from the integral MSR 200, in any of the configurations D-F, such gasses may be trapped by the fission product adsorbing/absorbing material and contained within the containment volume 282 of the sealed containment structure 280.

Figure 16:
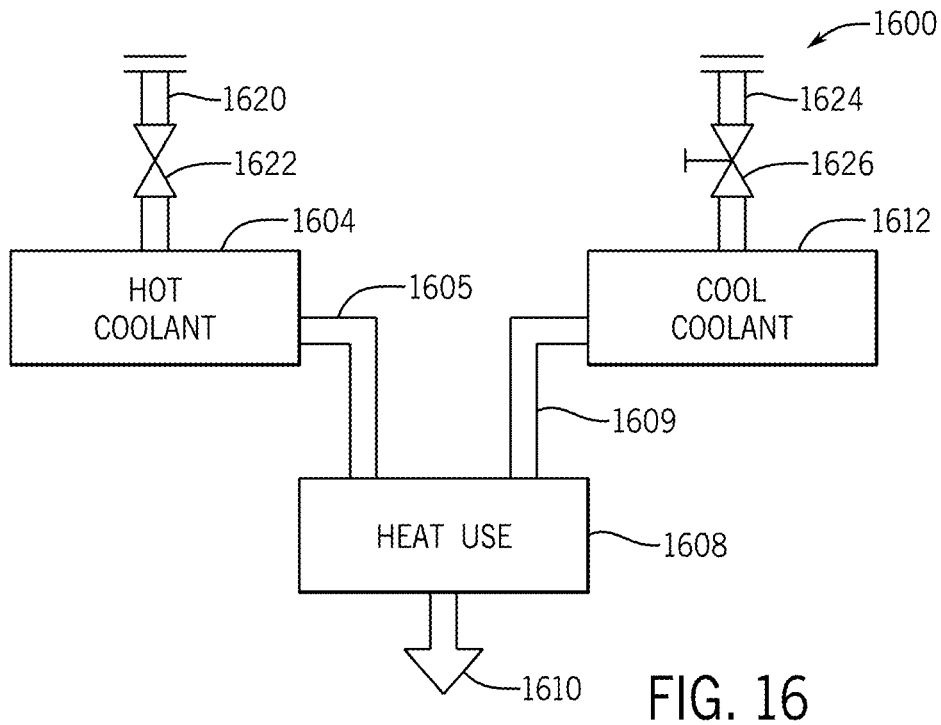
FIG. 16 depicts a functional diagram of a secondary coolant use system.

Turning to FIG. 16, a system 1600 is shown including a functional diagram of a secondary coolant use. For example, the system 1600 may be a modularly deployable system and couplable with the cooling modules described herein (e.g., the cooling module 110 of FIG. 1) to utilize the heat generated by the nuclear reactions in another process. As shown in FIG. 16, the system 1600 may include a pipe segment 1620 and associated control valve 1622. The pipe segment 1620 may be fluidly coupled to a source of elevated temperature coolant (e.g., such as a via the secondary coolant loop module 114 of the cooling module 110 of FIG. 1). The pipe segment 1620 may be supply said elevated temperature coolant to a hot coolant storage 1604. In some cases, the hot coolant storage 1604 may be or include a thermocline unit whereby coolant of a particular temperature (or temperature range) is directed from the storage 1604 for use in a specific process. In this regard, the system 1600 shows a pipe segment 1605 which may be configured to route the elevated temperature coolant to a heat use 1608. Example heat uses may include, without limitation, electricity production, water desalination, synthetic fuel production, hydrogen production, power storage, and provision of process heat to drive chemical processes, the output of any of which is represented in FIG. 16 by process output 1610. FIG. 16 further shows a pipe segment 1609 extending from the heat use 1608 and configured to carry reduced temperature coolant (e.g., as reduced by the heat use 1608) toward a cool coolant storage 1612. A pipe segment 1626 and associated valve 1624 may route the reduced temperature coolant back to a receptacle for reduced temperature coolant (e.g., such as the secondary coolant loop module 114 of the cooling module 110 of FIG. 1). The reduced temperature coolant may be subsequently reheated by the nuclear reactions of the various modules described herein and recirculated to the heat use 1610 for generation of additional quantities of the output 1610.

Figure 17:
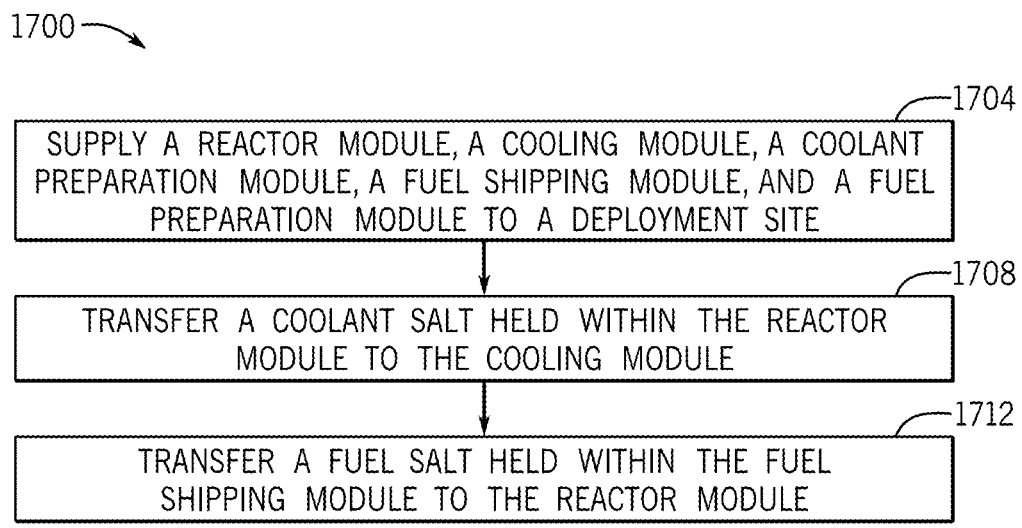
FIG. 17 depicts a flow diagram of a method of deploying a molten salt nuclear reactor.

With reference to FIG. 17, a flow diagram 1700 of a method of deploying a molten salt nuclear reactor is depicted. At operation 1704, a reactor module, a cooling module, a coolant preparation module, a fuel shipping module and fuel preparation module are supplied to a deployment site. For example, and with reference to FIG. 6, the cooling module 660, the coolant preparation module 604, the reactor module 650, the fuel preparation module 624, and the fuel shipping module 640 may each be provided to a deployment site, such as a generation location or other location. Each of the foregoing modules may be transported to the site via one or more semi-trailer trucks.

At operation 1708, a coolant salt that is held within the reactor module is transferred to the cooling module. For example, and with continued reference to FIG. 6, the reactor module 650 may include a coolant salt packed into the functional components of the reactor module 650 that would otherwise hold the fuel salt during operation. The reactor module 650 may be packed with fuel salt in such manner in order to facilitate the safe transport of the reactor module to the generation location. The coolant preparation module 604 may be operatively coupled with the reactor module 550 and used to transfer the coolant salt to the cooling module 660. For example, and as described herein, the coolant preparation module 604 may be used to heat, treat, and pump the coolant salt into one or more heat exchangers or loops of the cooling module 660.

At operation 1712, a fuel salt that is held within the fuel shipping module is transferred to the reactor module. For example, and with continued reference to FIG. 6, the fuel shipping module 640 may include a fuel salt held therein for transport on public roads and highways. The fuel preparation module 624 may be operatively coupled with the reactor module 650 and used to transfer the fuel salt to the reactor module 650. For example, and as described herein, the fuel preparation module 624 may be used to heat, treat, and pump the fuel salt into one or more vessels or sections of the reactor module that is capable of using the fuel salt to generate nuclear reactions. In other cases, other configurations and techniques of deploying an integral molten salt reactor are possible and contemplated herein.

Figure 18:
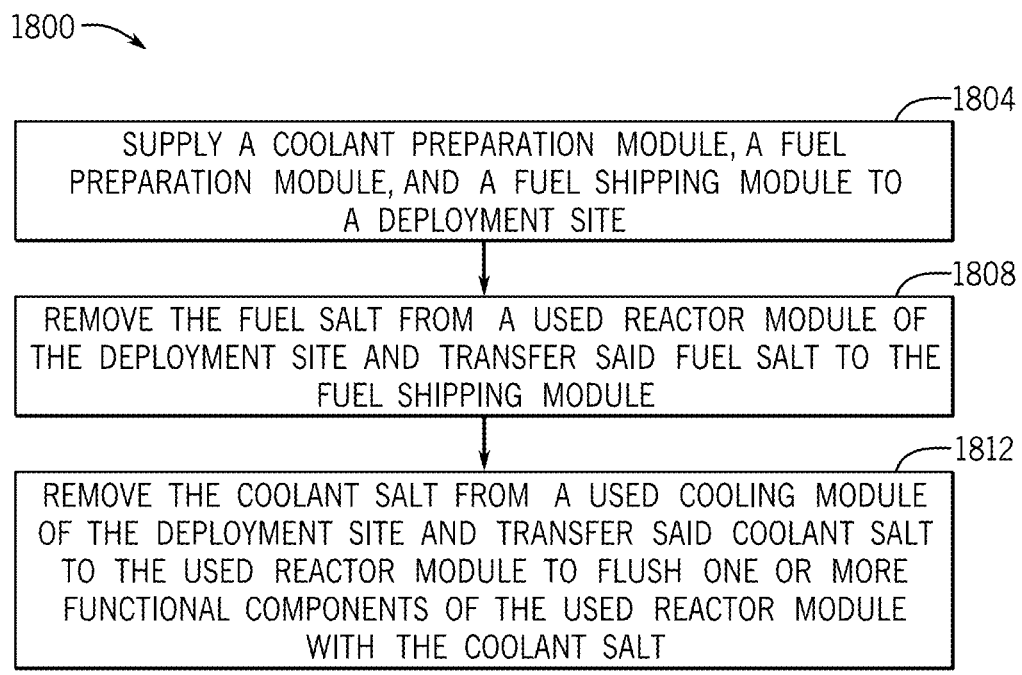
FIG. 18 depicts a flow diagram of a method of decommissioning an integral molten salt reactor.

With reference to FIG. 18, a flow diagram 1800 of a method of decommissioning a molten salt reactor is depicted. At operation 1804, a coolant preparation module, a fuel preparation module, and a fuel shipping module is supplied to a deployment site. For example, and with reference to FIGS. 11, the coolant preparation module 1028, the fuel shipping module 102, and the fuel preparation module 1024 may be brought to a deployment site, such as a generation location or other appropriate location. The deployment site may further include the used cooling module 1008 including a used coolant salt therein and the used reactor module 1004 including a used fuel salt therein.

At operation 1808, fuel salt is removed from a used reactor module of the deployment site and transferred to the fuel shipping module. For example, and with continued reference to FIG. 11, the used fuel salt of the used reactor module 1004 may be removed to the fuel shipping module via the fuel preparation module 1024. In some cases, as described herein, the fuel preparation module 1024 may operate to treat the fuel salt for storage and decommissioning in the fuel shipping module 1020. At operation 1812, coolant salt is removed from a used coolant module of the deployment site and transferred to the used reactor module to flush one or more functional components of the used reactor module with the coolant salt. For example, and with continued reference to FIG. 11, the used coolant salt of the used cooling module 1008 may be removed to the reactor module 1004 via the coolant preparation module 1028. In this regard, the used coolant salt may serve as a flush for the reactor to remove remaining free particles and actinides, among other contaminants. In some cases, as described herein, the coolant preparation module 1028 may operate to treat the coolant salt prior to transferring the coolant salt to the reactor module 1004. In other cases, other configurations and techniques of decommissioning a molten salt reactor are possible and contemplated herein.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A method of deploying a molten salt reactor, the method comprising
    shipping an integral molten salt reactor to a deployment site, the integral molten salt reactor comprising an integrally constructed vessel, wherein the integrally constructed vessel is packed with a coolant salt such that the coolant salt fills volumes of the integrally constructed vessel that would otherwise be filled by a fissile material containing fuel salt during operation of the integral molten salt reactor, and wherein the coolant salt is a non-fissile containing salt;
    shipping, separate from the reactor module, a fissile material containing fuel salt within a fuel shipping assembly to the deployment site;
    shipping, separate from the integral molten salt reactor and the fuel shipping assembly, a primary coolant loop, a coolant assembly, and a fuel preparation assembly to the deployment site;
    transferring, at the deployment site, using the coolant assembly, the coolant salt held within the integrally constructed vessel to the primary coolant loop; and
    transferring, at the deployment site, using the fuel preparation assembly, the fissile material containing fuel salt held within the fuel shipping assembly to the integrally constructed vessel.

2. The method of claim 1, wherein the transferring of the coolant salt further comprises treating, using the coolant assembly, the coolant salt, including filtering the coolant salt and/or chemically altering the coolant salt.

3. The method of claim 2, wherein the transferring of the coolant salt further comprises heating, using the coolant assembly, the coolant salt.

4. The method of claim 1, wherein the transferring of the fuel salt further comprises
    inducing, using the fuel preparation assembly, a flow of the fissile material containing fuel salt from an inner container of the fuel shipping assembly and into a holding tank of the fuel preparation assembly, and
    treating, using the fuel preparation assembly, the fissile material containing fuel salt, including filtering the fuel salt and/or chemically altering the fuel salt held within the holding tank.

5. The method of claim 1, wherein the transferring of the fissile material containing fuel salt further comprises
    inducing, using the fuel preparation assembly, a flow of the fissile material containing fuel salt from an inner container of the fuel shipping assembly and into a holding tank of the fuel preparation assembly, and
    heating, using the fuel preparation assembly, the fissile material containing fuel salt, including heating the fissile material containing fuel salt held within the inner container and/or the holding tank.

6. The method of claim 1, wherein the coolant salt is in a frozen phase within the volumes of the integrally constructed vessel that would otherwise be filled by said fuel salt during operation of the integral molten salt reactor.

7. The method of claim 1, wherein the fissile material containing fuel salt is in a frozen phase within the fuel shipping assembly.

8. The method of claim 7, wherein frozen phase fissile material containing fuel salt is packed within an inner container of the fuel shipping assembly that is encompassed within an outer container of the fuel shipping module, and
    wherein the outer container and inner container are configured to permit transport of the frozen phase fissile material containing fuel salt on public roads and highways to the deployment site.

9. The method of claim 1, wherein, during operation of the integral molten salt reactor, and subsequent to said transferring of the coolant salt and the fissile material containing fuel salt, said volumes filled by the fissile material containing fuel salt are fluidically separated from the primary coolant loop.

10. The method of claim 9, wherein, during operation of the integral molten salt reactor, and subsequent to said transferring of the coolant salt and the fissile material containing fuel salt, the method further comprises
    circulating the coolant salt along a primary coolant circulation path of the primary coolant loop, and
    transferring heat from the fissile material containing fuel salt of the integrally constructed vessel to the coolant salt of the primary coolant loop.

* * * * *